United States Patent [19]

Jewett et al.

[11] Patent Number: 5,374,068
[45] Date of Patent: Dec. 20, 1994

[54] METHOD FOR PROVIDING UNIFORM RADIAL CLEARANCE OF LABYRINTH SEALS BETWEEN ROTATING AND STATIONARY COMPONENTS

[75] Inventors: LeRoy D. Jewett; Earl H. Brinkman, both of Schenectady; Raymond J. Jones, Duanesburg; David B. Troischt, Schenectady, all of N.Y.

[73] Assignee: General Electric Co., Schenectady, N.Y.

[21] Appl. No.: 981,520

[22] Filed: Nov. 25, 1992

Related U.S. Application Data

[63] Continuation-in-part of Ser. No. 927,920, Aug. 12, 1992, abandoned, which is a continuation of Ser. No. 696,760, May 7, 1991, abandoned.

[51] Int. Cl.$^5$ ............................................ F16J 15/447
[52] U.S. Cl. ........................................ 277/1; 277/11; 277/54
[58] Field of Search ................ 277/1, 9, 11, 53–56, 277/57, 147–150, 192; 415/170.1, 173.1, 173.3, 173.5, 174.2, 174.5

[56] References Cited

U.S. PATENT DOCUMENTS

| | | |
|---|---|---|
| 1,792,288 | 2/1931 | Dempster . |
| 2,279,863 | 4/1942 | Downer . |
| 2,600,991 | 6/1952 | Hargrove . |
| 3,594,010 | 7/1971 | Warth ................................. 277/53 |
| 4,436,311 | 3/1984 | Brandon . |
| 5,002,288 | 3/1991 | Morrison et al. . |
| 5,181,308 | 1/1993 | Gray et al. . |

FOREIGN PATENT DOCUMENTS

| | | |
|---|---|---|
| 764818 | 5/1934 | France . |
| 1079406 | 4/1960 | Germany ............................. 277/53 |
| 724316 | 2/1955 | United Kingdom . |

Primary Examiner—Scott W. Cummings
Attorney, Agent, or Firm—Nixon & Vanderhye

[57] ABSTRACT

Arcuate seal segments have radially directed seal faces forming part of a labyrinth seal in a turbine. The segments are adjustably spaced from the locating flanges of the groove formed on a stationary part of the turbine housing to compensate for any distortion of the groove through use. In a positive pressure, variable clearance labyrinth seal, side seals are disposed between the locating flanges of the groove and the flanges of the seal segments and have surfaces at circumferentially spaced positions which are adjustable to maintain concentricity of the seal faces of the seal segments, notwithstanding the distortion of eccentricity of the groove and its locating flanges. Where the locating flanges of the segments normally engage the locating flanges of the groove, variable clearances are provided between those flanges by the interposition of dowels, plugs or pads such that the seal faces of the segments are maintained concentric, notwithstanding distortion of the locating fits.

10 Claims, 20 Drawing Sheets

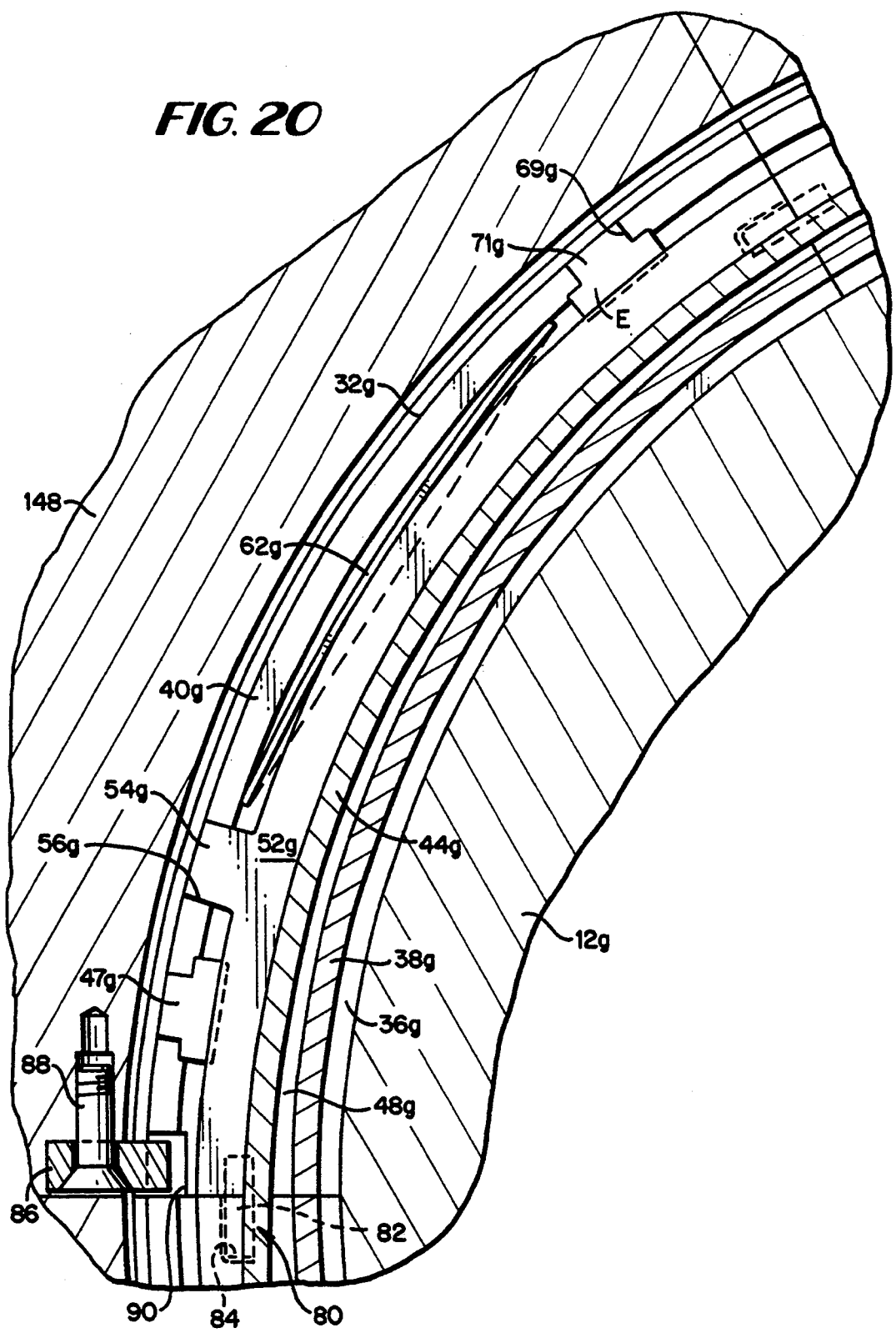

METHOD FOR PROVIDING UNIFORM RADIAL CLEARANCE OF LABYRINTH SEALS BETWEEN ROTATING AND STATIONARY COMPONENTS

RELATED APPLICATIONS

This application is a continuation-in-part of application Ser. No. 07/927,920, filed Aug. 12, 1992, now abandoned by LeRoy D. Jewett and Earl H. Brinkman, for APPARATUS AND METHODS FOR MAINTAINING THE CONCENTRICITY OF SEALS BETWEEN ROTATING AND STATIONARY COMPONENTS, which, in turn, is a continuation application of Ser. No. 07/696,760, filed May 7, 1991, now abandoned, by LeRoy D. Jewett for "APPARATUS FOR MAINTAINING THE CONCENTRICITY OF SEALS BETWEEN ROTATING AND STATIONARY COMPONENTS," the disclosures of which applications are incorporated herein by reference.

TECHNICAL FIELD

The present invention relates to seals between rotating and stationary components of a machine, for example, a steam turbine, and particularly relates to apparatus and methods for ensuring concentricity of a stationary seal face about the sealing surface of a rotating component, i.e., ensuring a substantially uniform radial clearance about and between the stationary seal face and the rotary component, in the event the stationary seal support structure is distorted or out-of-round, eccentric or non-standard in size. The present invention therefore attains the heretofore unattainable uniform seal to rotor radial clearance in the presence of a locating fit for the stationary seal face which is out-of-round, eccentric to the axis of rotation, or a custom or off-standard size. The present invention compensates for these factors in the stationary support structure without compromising the geometrical concentricity of the stationary seal face about the rotating sealing surface.

BACKGROUND

In many machines, seals are provided between rotating and stationary components. For example, in steam turbines, it is customary to employ a plurality of arcuate seal ring segments to form a labyrinth seal about and between the stationary and rotating components. Typically, the arcuate seal ring segments are disposed in an annular groove in the stationary component designed to be concentric about the axis of rotation of the machine and hence concentric to the sealing surface of the rotating component. Each arcuate seal segment carries an arcuate seal face in opposition to the sealing surface of the rotating component. In labyrinth-type seals, the seal races carry a radially-directed array of axially spaced teeth, and which teeth are radially spaced from an array of axially spaced annular grooves forming the sealing surface of the rotating component. Alternatively, the rotating component may have a smooth surface in radial opposition to the array of teeth on the seal faces. In any event, the sealing function is achieved by creating turbulent flow of a working media, for example, steam, as it passes through the relatively tight clearances within the labyrinth defined by the seal face teeth and the opposing surface of the rotating component.

In a typical installation, the annular groove is dovetail-shaped, having locating flanges directed axially toward one another and defining a slot therebetween. The stationary component is split lengthwise such that the semi-annular dovetail grooves may receive correspondingly-shaped arcuate seal ring segments. More particularly, the arcuate segments are similarly dovetail-shaped, having a pair of flanges directed axially away from one another for disposition within the dovetail groove and a neck joining the seal face and the flanges of the segment and passing through the slot defined by the locating flanges of the groove. The neck carries the arcuate seal face radially inwardly of the groove when installed.

In this type of seal, the ability to maintain a tight uniform clearance without physical contact between the rotating and stationary components is critical to the formation of an effective seal. If this radial clearance between the seal faces of the segments and the opposing seal surface of the rotating component becomes too large, less turbulence is produced and the sealing action is compromised. Conversely, if the clearance is too tight, the sealing teeth may contact the rotating element, with the result that the teeth lose their shard profile and tight clearance and thereafter create less turbulence, likewise compromising the sealing action.

Seals of this type often do not obtain the designed uniform radial clearance about and between the stationary and rotating components for a number of reasons. For example, the locating fits, i.e., the locating flanges of the stationary component, may be distorted or out-of-round, relative to the sealing surface of the rotor. Conversely, the locating fits may be perfectly round but lie eccentric to the sealing surface and axis of the rotary component. The radial clearance between the stationary seal faces and the sealing surface of the rotating component, in either case, will not therefore be uniform about the rotor axis. Thirdly, the locating fit may be a custom size or non-standard in size. Even though round, it may not provide the designed radial clearance between the stationary and rotating components when the seal ring segments are replaced. Of course, various combinations of out-of-roundness, eccentricity and non-standard sizes may occur.

Turning first to the locating fits which have become distorted or out-of-round, e.g., as a result of high-pressure and temperature applications, such distortion directly affects the dimensional consistency of the labyrinth seal's internal clearance and thus the seal's effectiveness. In most instances, the locating flanges will distort, with an opening effect on one axis which will result in a closing effect on a perpendicular axis. For example, the locating flanges on the stationary component tend to be deformed into an elliptical configuration which prevents the formation of a uniform seal clearance about the rotating component. The magnitude of the ellipticity present translates directly into excessive clearance of the seal faces of the segments relative to the sealing surface of the rotor across the major diameter of the elliptical bore and minimum clearance across the minor diameter of the elliptical bore. The seal clearances thus vary from a condition of interference on one axis and excessive clearance on the other, resulting in loss of the effectiveness of the seal.

As noted previously, the locating fits may themselves be round, but due to variations in alignment they may not lie concentric to the sealing surface of the rotating component. As a consequence, the seal faces of the segments may lie eccentric to the locating fits, i.e., the locating flanges, but do not afford a uniform radial clearance between the stationary seal faces and the sealing surface of the rotating component about the full circumference of those components. Also, where the locating flanges are non-standard or of unknown dimension due to prior field machining, standard seal segments may not provide the designed uniform radial clearance even if the locating flanges are perfectly round. The seal clearances must be maintained substantially uniform and at the designed clearance.

When renewing labyrinth seals of this type after use, the design of the locating flanges of the groove into which the arcuate segments fit prevent their ready adjustment in radial location. Restoration of the locating flanges of the groove is too costly. Typically, when new arcuate seal segments are installed into a groove where the locating flanges are distorted or out-of-round, or eccentric, the installer carefully identifies the locations where the seal clearance is too tight. Once identified, the installer hand-scrapes or grinds the edges of the seal teeth to produce the necessary clearance. No remedial action is typically taken where the seal tooth-to-rotor clearance is excessive. This excessive clearance is conventionally left in an as-is condition. Because of the time and expense involved in the restoration of the locating flanges of the groove to true concentricity about the rotor surface, excessive seal clearances were simply heretofore accepted as a parasitic loss associated with age and distortion and not repaired.

These problems are extant both for conventional labyrinth seals, i.e., where the locating flanges of each arcuate seal segment engage directly on the locating flanges of the groove and springs bias the segment for radial inward movement, as well as for positive pressure variable clearance type, labyrinth seals, where the arcuate seal segments are movable radially relative to the groove to control, adjust or vary the clearance between the seal faces of the stationary component and the rotary component in response to changes in operating conditions of the rotary machine. An example of the latter type of labyrinth seal is described and illustrated in co-pending application Ser. No. 07/257,471, filed Oct. 13, 1988, of common assignee herewith, now U.S. Pat. No. 5,002,288, the disclosure of which is incorporated herein by reference. The foregoing problems are cured by the present invention.

DISCLOSURE OF THE INVENTION

According to the present invention, there is provided apparatus and methods providing for substantially uniform radial clearance about and between the seal surfaces of the stationary and rotating components when installing arcuate packing ring segments in rotary machines employing labyrinth seals without compromising the integrity or efficiency of the seal. More particularly, replacement arcuate segments are provided with locating or hook flanges concentric to the axis of rotation of the machine. By altering the clearance, however, between the locating flanges of the arcuate segments and the locating flanges of the groove about the axis of the machine, any distortion, or out-of-roundness, eccentricity or non-standard size of the locating flanges of the groove are taken into account and the arcuate segments may thus be installed with their seal faces substantially concentric with the sealing surface of the rotor shaft.

To accomplish this in conventional labyrinth seals, locating elements having locating surfaces are spaced along the locating flanges of the arcuate segments. These locating elements may be provided in a number of ways. For example, dovetail-shaped elements, e.g., T-shaped blocks or pads, may be provided for disposition in complementary shaped keyways formed in the segments. The locating surfaces of the elements project below the locating flanges of the segments and are adjustable, e.g., by grinding, to an appropriate depth, to adjust the clearance between the locating flanges of the segment and groove thereby to maintain concentricity of the stationary and rotating seal faces while simultaneously mounting the arcuate segments directly on the distorted, eccentric or non-standard size locating flanges of the groove. In another form, the arcuate segments may be provided with axially extending dowels extending below the surfaces of the flanges of the segments. The dowels may be machined to variably space the segment flanges from the distorted, eccentric or non-standard size locating flanges of the grooves to establish and maintain the desired uniform radial clearance of the stationary seal faces relative to the sealing surface of the rotor. Other types of pins or pads may be employed and have locating surfaces adjustable to adjust the spacing between the segment and groove locating flanges. In these embodiments, the spacing may be adjusted by the addition or subtraction of material at various predetermined locations or combinations of additive and subtractive materials may be employed. Also, the locating elements can be radially displaced relative to the segments to adjust the locating surfaces.

In the case of positive pressure variable clearance-type seal segments, springs are provided below the segment locating flanges and engage the groove locating flanges to bias the segments radially outwardly. Locating elements are provided in the groove, preferably carried by the flanges of the segments as in the conventional type labyrinth seals discussed above, and have locating surfaces disposed below the segment flanges for engagement with the locating flanges of the groove. By adjusting the location of these surfaces in a radial inner direction, i.e., by adding material to the surfaces, or in a radial outward direction, i.e., by removing material from the surfaces, or by otherwise displacing the locating surfaces, the seal faces of the segments are maintained in substantially uniform and designed radial clearance relative to the sealing surface of the rotor.

In certain other positive pressure packing ring segment applications where the segments are exposed to high fluid pressure, side seals are employed. These side seals form spacers or buffers between the locating flanges of the arcuate segments and the locating flanges of the groove. In accordance with the present invention, contact or locating surfaces between the aide seals and the locating flanges of the arcuate segments (or between the side seals and the locating flanges of the groove) can be altered, for example, by grinding, or adding material, to compensate for the distorted, eccentric or non-standard size of the locating flanges of the groove thereby to maintain a uniform radial clearance between each arcuate seal segment face and the sealing surface of the rotary component. This adjustment can be accomplished uniformly in the case of custom or non-standard sizes or non-uniformly in the case of out-of-roundness or eccentricity of the locating flanges of the groove. That is, the adjustable spacing is provided by adjusting the radial extent of the locating surfaces of the side seals at circumferential locations about the segments in accordance with the measured distortion, eccentricity or non-standard size of the fit or groove at corresponding circumferential locations about the fit or groove. In this manner, a uniform clearance is maintained between the segment seal faces of the positive pressure packing ring relative to the sealing surface of the rotating component, notwithstanding the distortion, eccentricity, or non-standard size of the locating fit or flanges of the groove.

Consequently, the present invention provides for initial installation or replacement of conventional or positive pressure arcuate seal ring segments in a rotary machine in a manner enabling compensation for stationary support distortion, eccentricity or non-standard sizes whereby a uniform designed radial clearance between the segment seal faces and the sealing surface of the rotor shaft is obtained.

Seals between rotating and stationary components have also employed arcuate half-ring segments. In seals of this type, each segment has a locating flange projecting to one side of its neck and a sealing flange mounting the sealed teeth projecting from the same side of the neck of the segment. A corresponding fit in the stationary component is provided in the form of a groove having a single axially directed locating flange. Locating elements are provided on the one side of the segment and have locating surfaces in the groove which can be adjusted similarly, as previously described, to establish a substantially uniform radial clearance about and between the rotating component and the segmented seal faces.

The present invention may also be applied to seals formed elsewhere in a machine have rotating and stationary components. For example, in a turbine, the rotating buckets are normally provided with a bucket cover which forms a seal with a stationary tip spill strip segment mounted in a stationary portion of the machine. The tip spill strip segment is conventionally mounted in a single locating hook or flange in a mounting groove by locating the segment flange against the groove locating flange. In accordance with the present invention, the existing flange can be machined and locating elements placed in the segment at circumferential positions about the segment such that locating surfaces are disposed between the segment flange and the groove flange. By adjusting these locating surfaces, i.e., by adding material or subtracting material, or displacing them, to vary their radial location, the distortion, eccentricity or non-standard size grooves can be compensated for to establish and maintain uniform radial clearance between the tip spill strip segment and the bucket vane cover.

Accordingly, in accordance with a preferred embodiment of the present invention, there is provided, in a machine having rotating and stationary components formed about an axis, a seal comprising an annular groove formed in the stationary component including at least one axially directed locating flange about the axis and in part defining a slot opening into the groove, the seal further including about the machine axis a plurality of arcuate segments each having an arcuate seal face, a neck portion received in the slot and at least one axially directed flange disposed within the groove and spaced radially from said locating flange, and locating elements in the groove between the flanges of the segments and the locating flange at spaced circumferential positions about the axis, the locating elements being adjustable in a radial direction to enable adjustment of the radial spacing between the locating flange and the flanges of the segments thereby establishing a substantially uniform radial clearance about and between the rotating component and the segment seal faces.

In another preferred embodiment of the present invention, there is provided, in a machine having rotating and stationary components formed about an axis, a seal comprising an annular groove formed in the stationary component and including a pair of locating flanges about the axis and directed axially toward one another defining a slot therebetween, the seal further including about the machine axis a plurality of arcuate segments each having an arcuate seal face, a neck portion received in the slot and a pair of flanges directed axially away from one another and disposed within the groove, the flanges of the segments and the locating flanges of the grooves being radially spaced from one another, and locating elements in the groove between the flanges of the segments and the locating flanges at spaced circumferential positions about the axis, the locating elements being adjustable in a radial direction to enable adjustment of the radial spacing between the locating flanges of the groove and the flanges of the segments thereby establishing a substantially uniform radial clearance about and between the rotating component and the segment seal faces.

In a further preferred embodiment of the present invention, there is provided for installation in a machine having rotating and stationary components formed about an axis wherein the stationary component has an annular groove including at least one axially directed locating flange about the axis and in part defining a slot opening into the groove, an arcuate seal segment having an arcuate neck portion for reception in the slot, an arcuate seal face extending axially to one side of the neck portion and along a radially innermost portion of the segment and at least one hook flange directed axially to one side of the neck portion along a radially outermost portion of the segment for disposition with the groove. The hook flange and the arcuate seal face being radially spaced from one another, and locating elements are carried by the segment at spaced circumferential positions along the segment on the one side of the neck portion, the locating elements having locating portions radially inwardly of the hook flanges adjustable in a radial direction to enable adjustment of the radial spacing between the hook flange and the locating flange of the stationary component thereby to establish, upon application of the segment to the stationary component, a substantially uniform radial clearance about and between the rotating component and the seal face.

In a still further embodiment of the present invention, there is provided, in a steam turbine having rotating and stationary components formed about a machine axis, a seal comprising an annular groove formed in the stationary component including a locating flange out-of-round or eccentric about the machine axis, a plurality of arcuate seal segments disposed about the rotor axis and having seal faces forming a seal ring about the rotor, and, means cooperable between the segments and the out-of-round or eccentric locating flange for adjusting segments in accordance with the extent to which the locating flange is out-of-round or eccentric about the axis to establish a substantially uniform radial clearance about and between the rotating component and the segment seal faces.

In yet another embodiment of the present invention, there is provided in a machine having a component rotatable about an axis and a stationary component including an annular groove about the axis, the stationary component having at least one axially directed locating flange about the axis and in part defining a slot opening into the groove and a plurality of annular segments about the axis, each segment having an arcuate seal face, at least one axially directed flange for disposition in the groove, and a neck portion receivable in the slot and interconnecting the seal face and the flange of the segment, a method of compensating for deviation in radial clearance between the seal faces and the rotatable component from a predetermined substantially uniform radial clearance therebetween comprising the steps of identifying the extent of the deviation of the locating flange of the groove from a predetermined radial location thereof about the axis, and adjustably spacing the flanges of the segment relative to the locating flange of the groove in accordance with the extent of the deviation of the locating flange of the groove from the predetermined radial location thereof about the axis to establish a substantially uniform radial clearance about and between the seal of the segments and the rotating component.

In a still further embodiment of the present invention, there is provided in a machine having a component rotatable about an axis and a stationary component including an annular groove out-of-round or eccentric about the axis, the stationary component having a pair of axially inwardly directed locating flanges and a plurality of annular segments about the axis, each segment having an arcuate seal face, a pair of flanges directed axially away from one another and disposed in the groove, and a neck portion received in the slot and interconnecting the seal face and pair of flanges, a method of compensating for out-of-roundness or eccentricity of the locating flanges about the axis, comprising the steps of identifying the extent of out-of-roundness or eccentricity of the locating flanges of the groove, and adjustably spacing the flanges of the segments relative to the locating flanges of the groove in accordance with the extent of out-of-roundness or eccentricity of the flanges of the groove about the axis such that the seal faces of the segments provide a substantially uniform radial clearance with the rotating component.

Accordingly, it is a primary object of the present invention to provide novel and improved apparatus and methods for maintaining a uniform radial clearance between the seal faces of a stationary component relative to the sealing surface of a rotating component in a manner which compensates for any distortion or out-of-roundness, eccentricity, or non-standard size of the locating fit on the stationary support mounting the seal faces.

These and further objects and advantages of the present invention will become more apparent upon reference to the following specification, appended claims and drawings.

BRIEF DESCRIPTION OF THE DRAWING FIGURES

Figure 16:
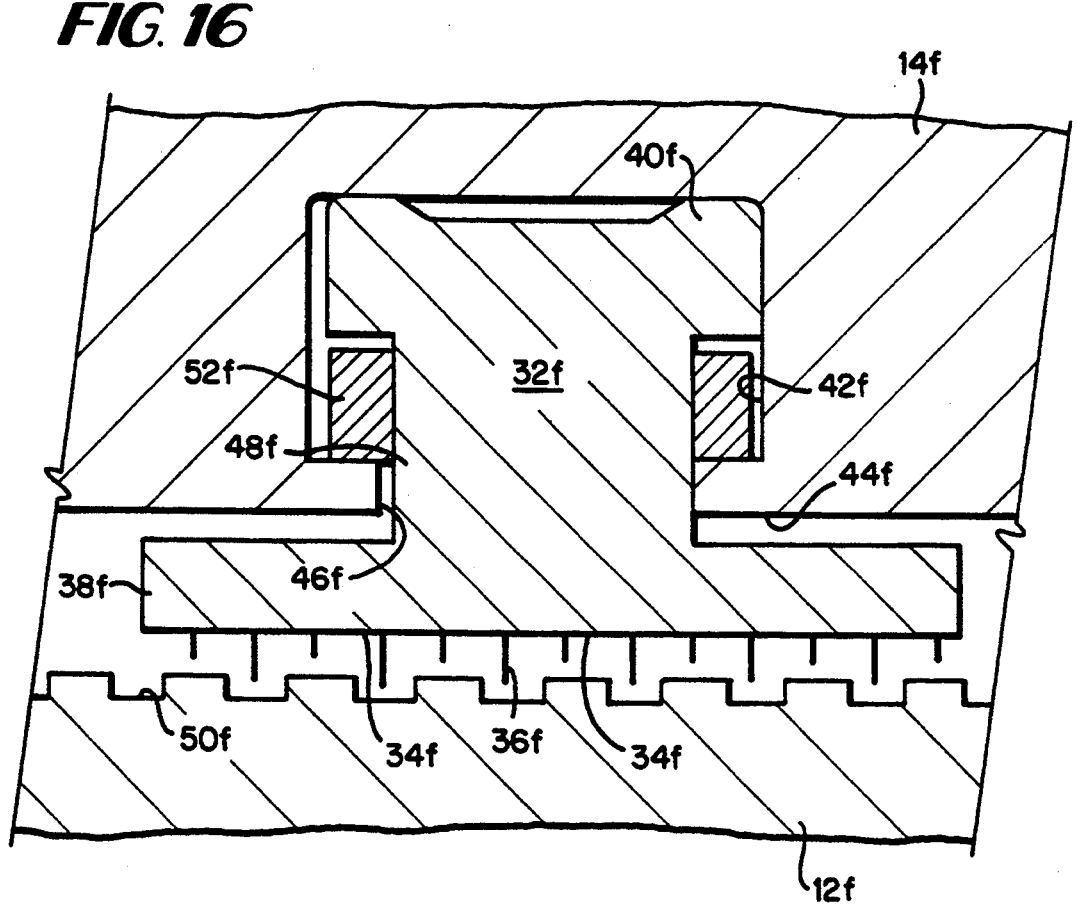
Figure 17:
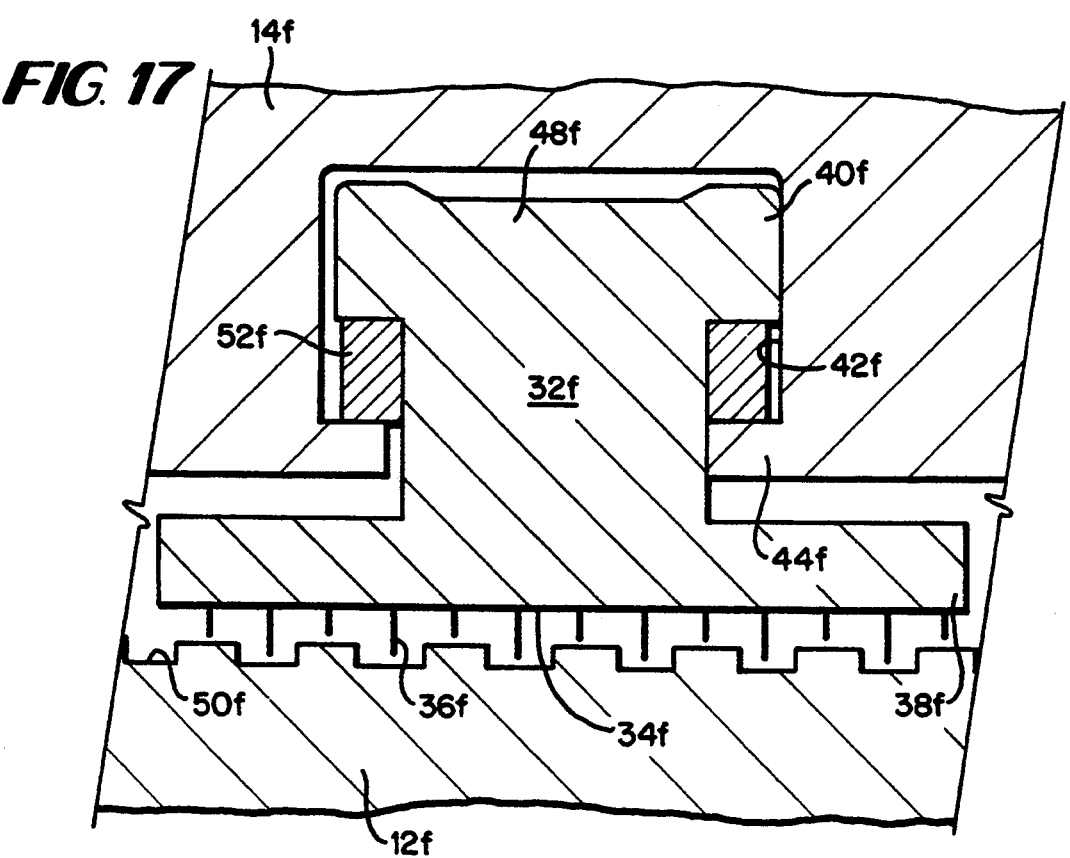
Figure 18:
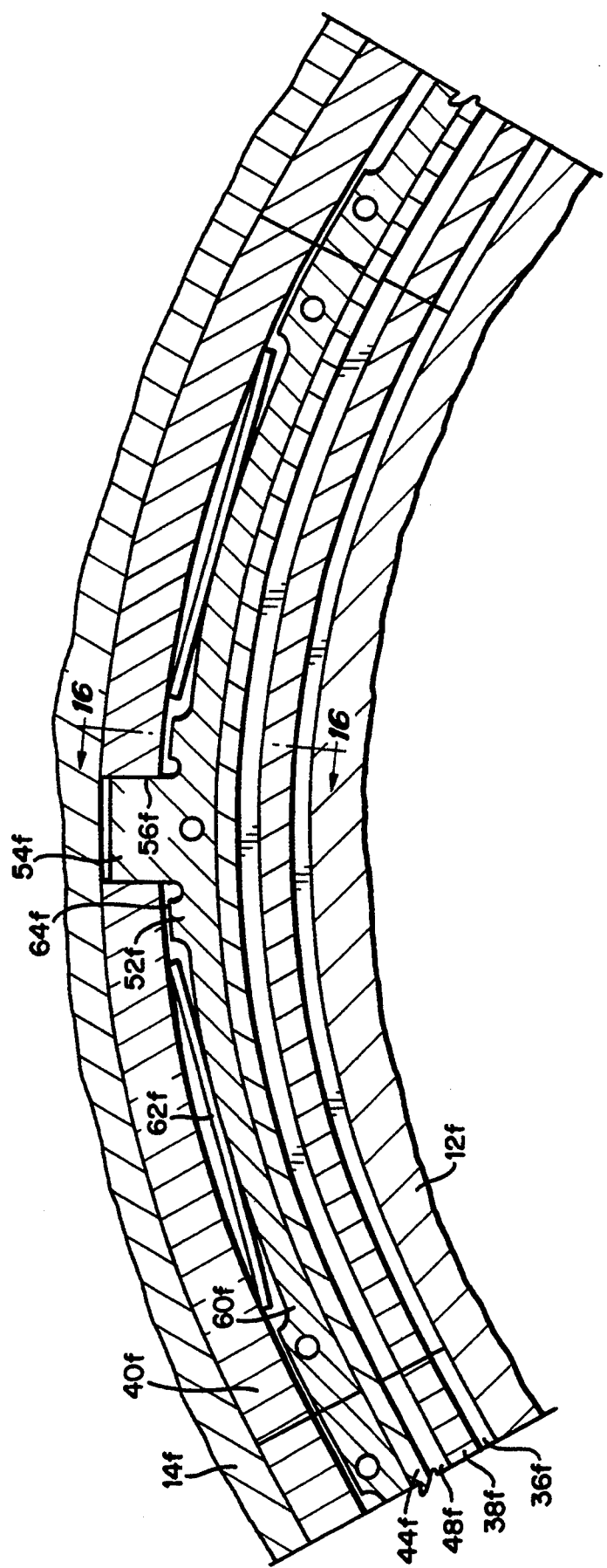
Figure 19:
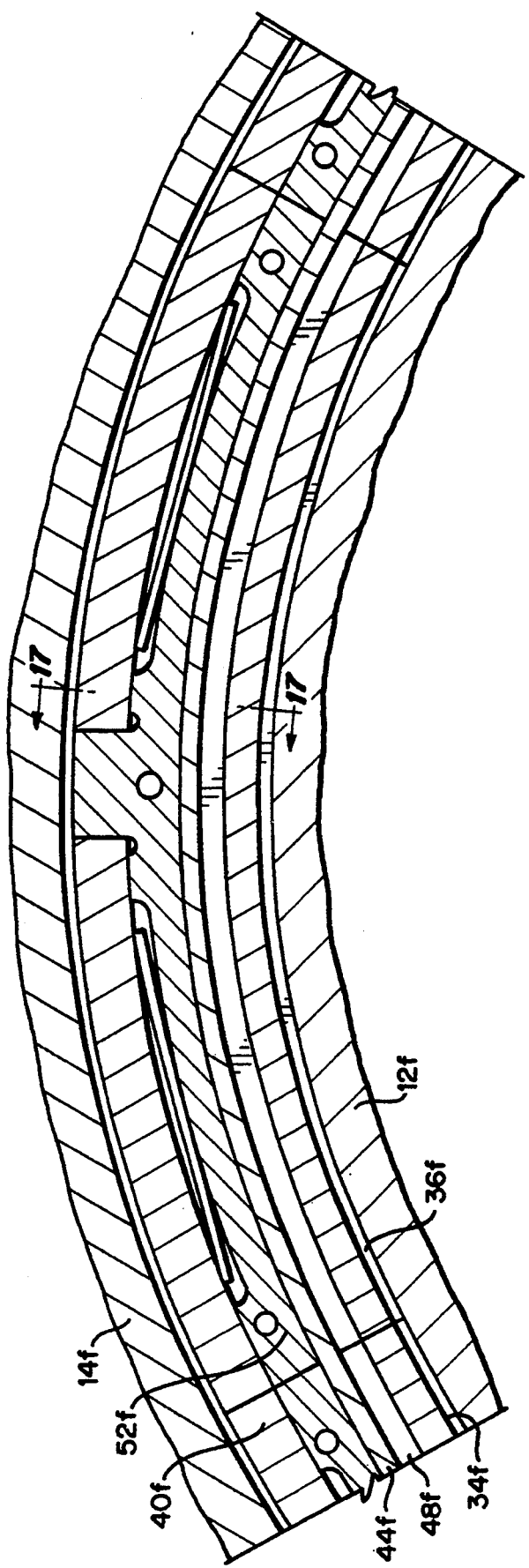
Figure 19A:
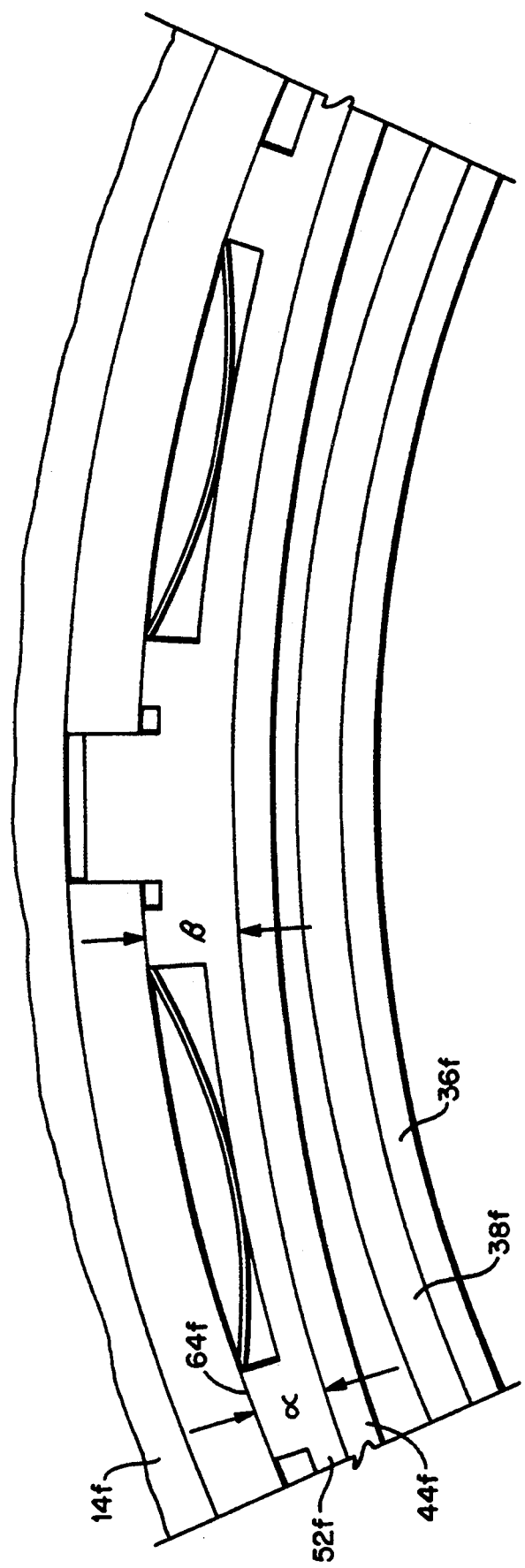
Figure 21:
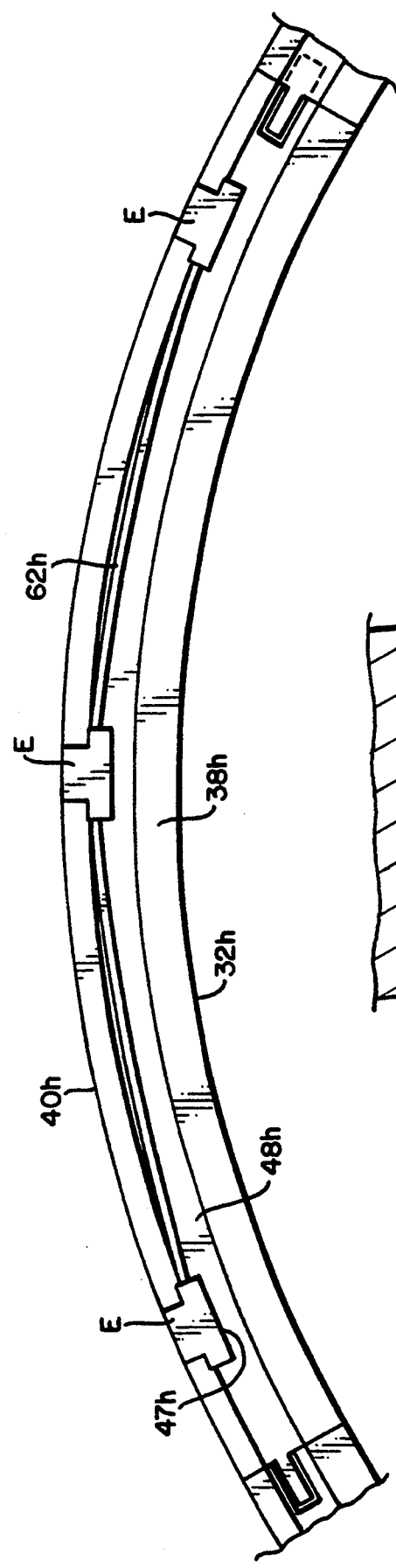
Figure 23:
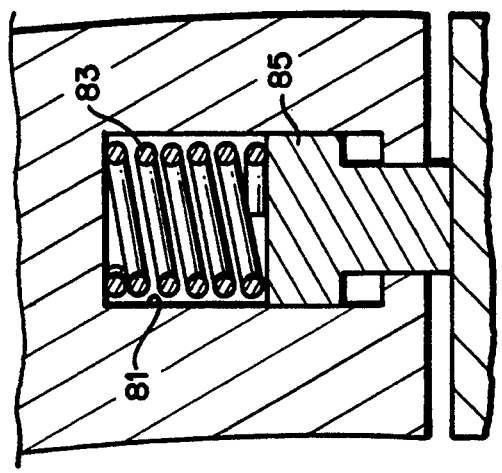
Figure 22A:
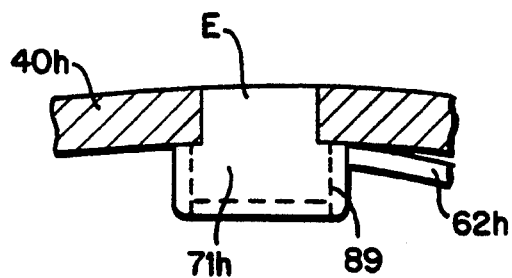
Figure 22B:
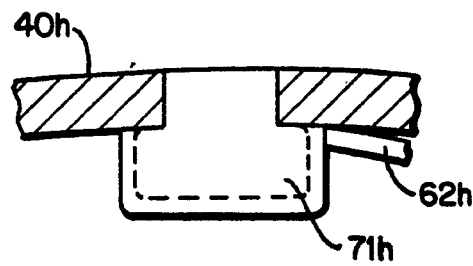
Figure 22C:
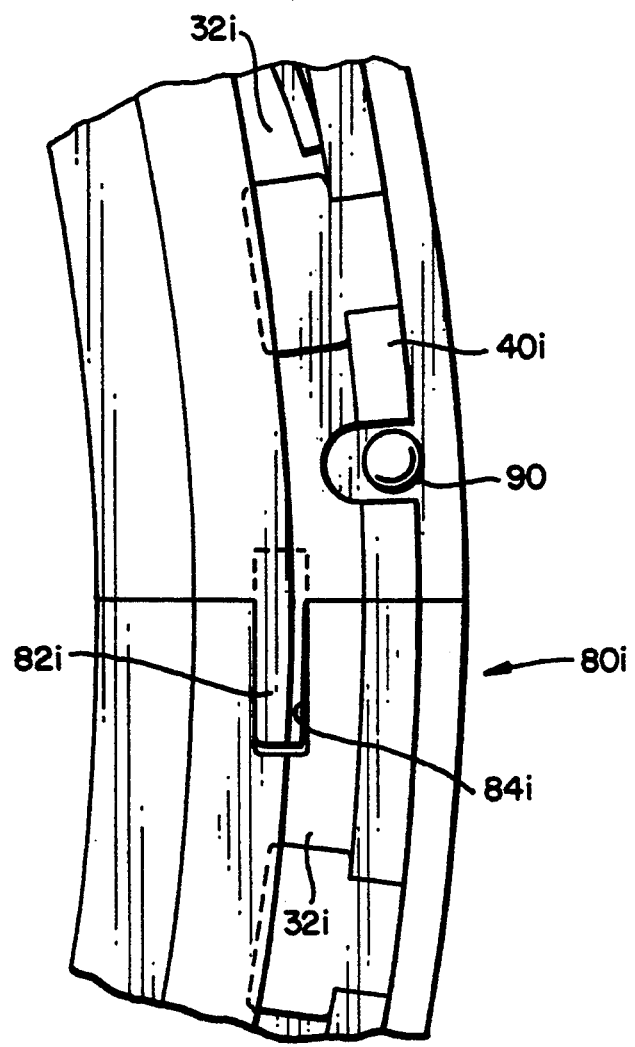
Figures 24, 24A:
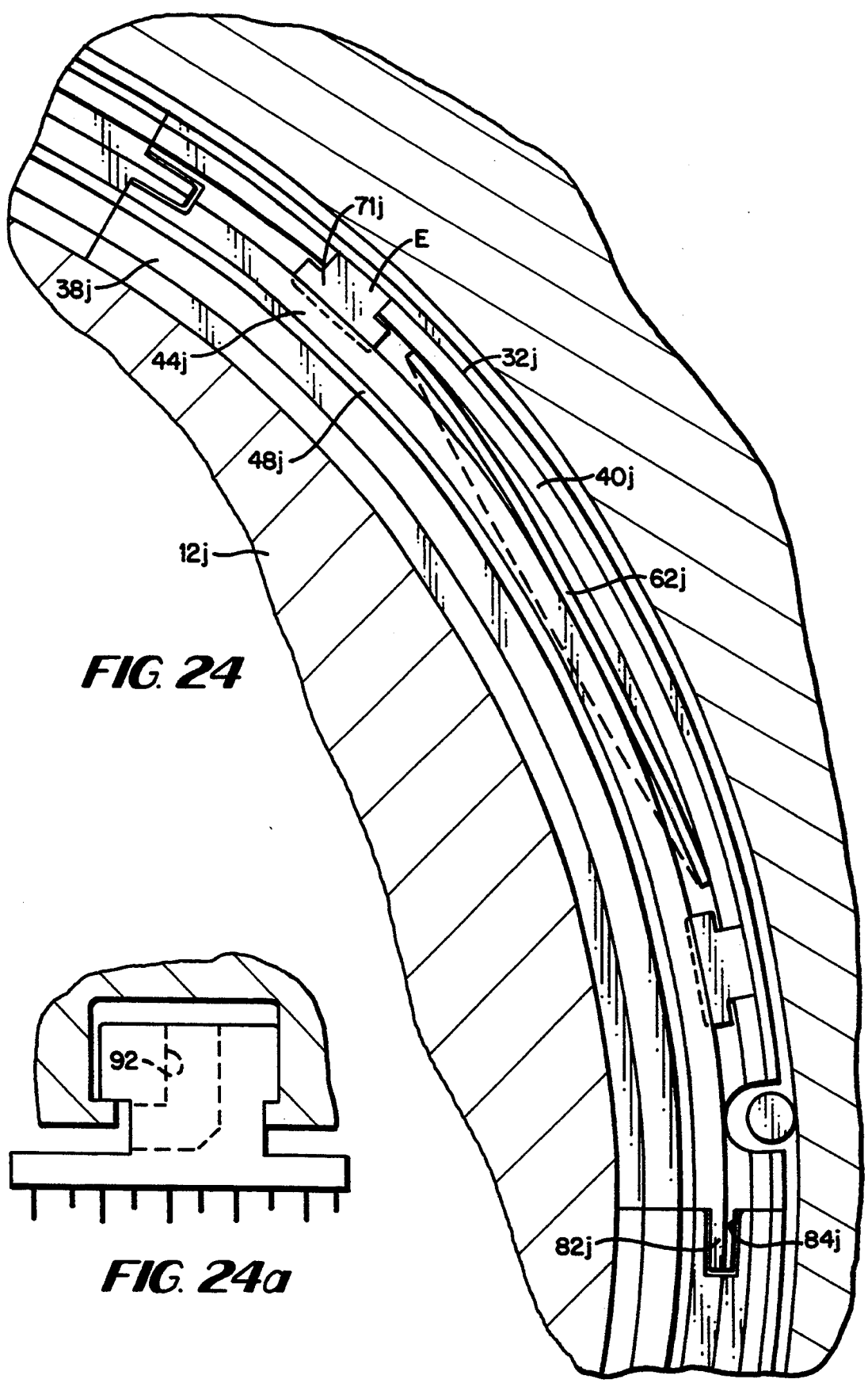
Figure 25:
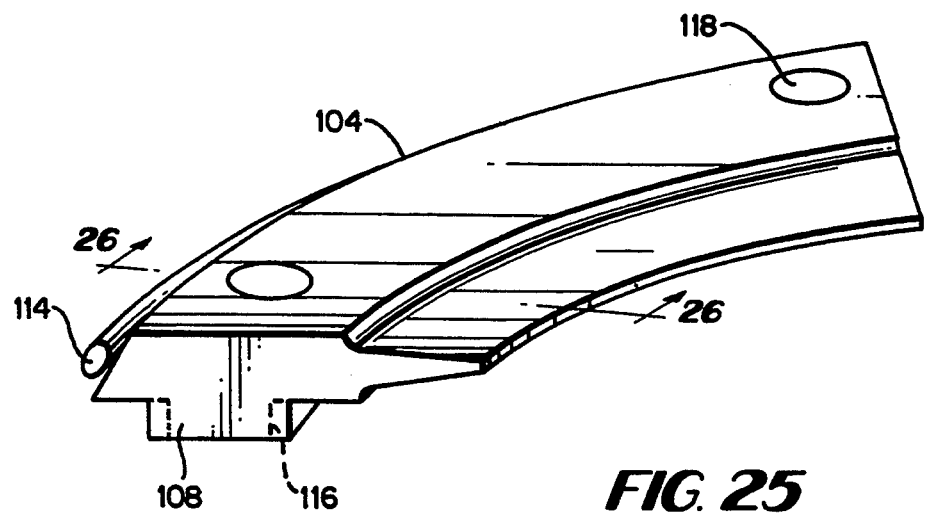
Figure 26:
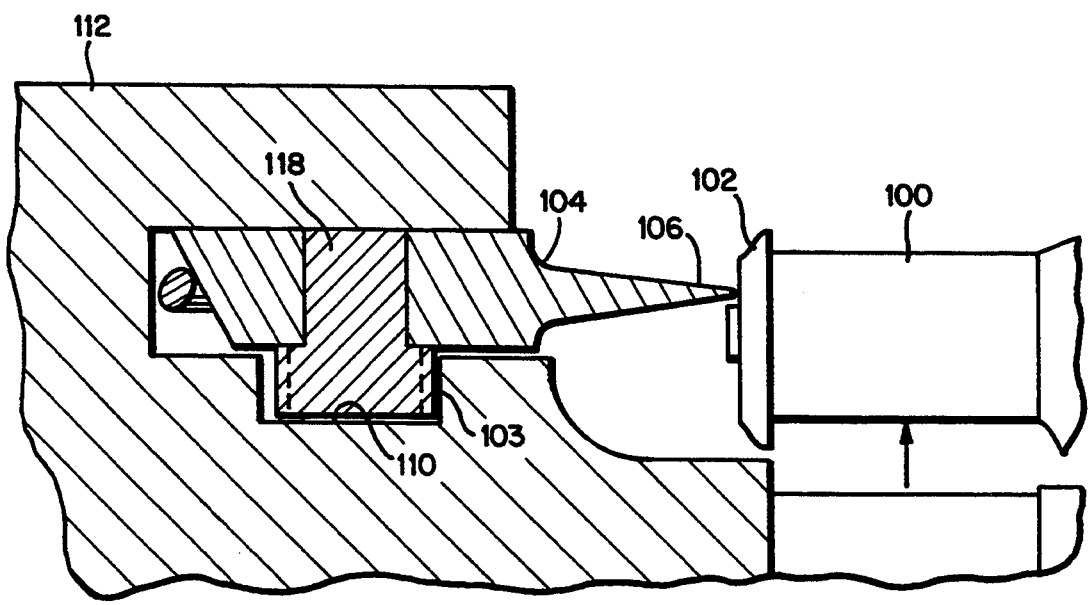
Figure 27:
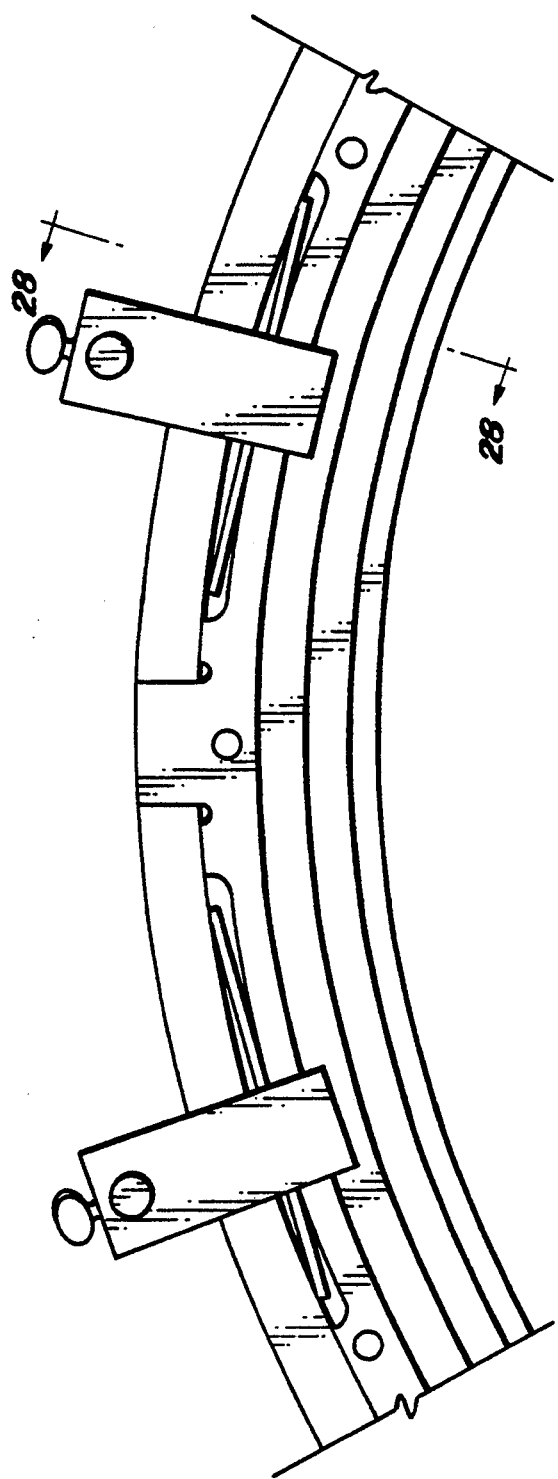
Figure 28:
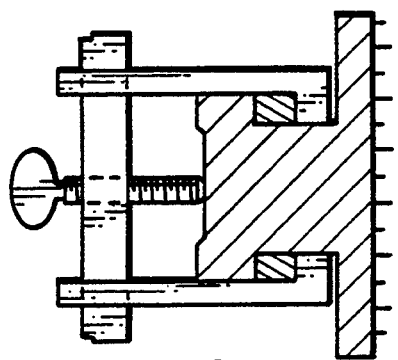

FIGS. 16 and 17 are enlarged fragmentary cross-sectional views taken transversely of the axis of the turbine and illustrating a labyrinth seal of the positive pressure variable clearance packing type according to a further embodiment of the present invention in open and closed positions, respectively, and taken generally about on lines 16—16 and 17—17 in FIGS. 18 and 19, respectively;

FIGS. 18 and 19 are fragmentary axial cross sectional views illustrating the labyrinth seal of FIGS. 16 and 17 in the respective open and closed positions;

FIG. 19A is a schematic view similar to FIG. 19 on an exaggerated scale to further illustrate the present invention;

FIG. 20 is an enlarged fragmentary view looking in the axial direction illustrating a further form of seal segments employing the locating elements hereof;

FIG. 21 is a side elevational view of seal segments and locating elements according to another embodiment of the present invention and looking in the axial direction;

FIGS. 22A and 22B are enlarged schematic cross-sectional illustrations of the juncture of the ends of leaf springs and locating elements and illustrating the manner of changing the deflection force of the springs;

FIG. 22C is an enlarged fragmentary elevational view looking in the axial direction illustrating a joint between adjacent segments and a pin for maintaining the segments in the upper turbine housing;

FIG. 23 is an enlarged fragmentary cross sectional view of a butt seal between adjacent ring segments;

FIG. 24 is a view similar to FIG. 20 illustrating a further form of the present invention;

FIG. 24A is a cross-sectional view thereof, illustrating a steam opening through the segment into the groove;

FIG. 25 is a perspective view of a sealing segment forming a seal about the turbine bucket cover illustrated in FIG. 26 according to a further form of the present invention;

FIG. 26 is an enlarged cross-sectional view illustrating the mounting of the segment of FIG. 25 and its seal with the turbine bucket;

FIG. 27 is a side elevational view of a positive pressure packing ring segment with side seals and compression tools applied thereto holding the segment in assembly; and, FIG. 28 is a cross sectional view thereof taken generally about on line 28—28 in FIG. 27.

DETAILED DESCRIPTION OF THE DRAWING FIGURES

Reference will now be made in detail to a present preferred embodiment of the invention, an example of which is illustrated in the accompanying drawings.

Figure 1:
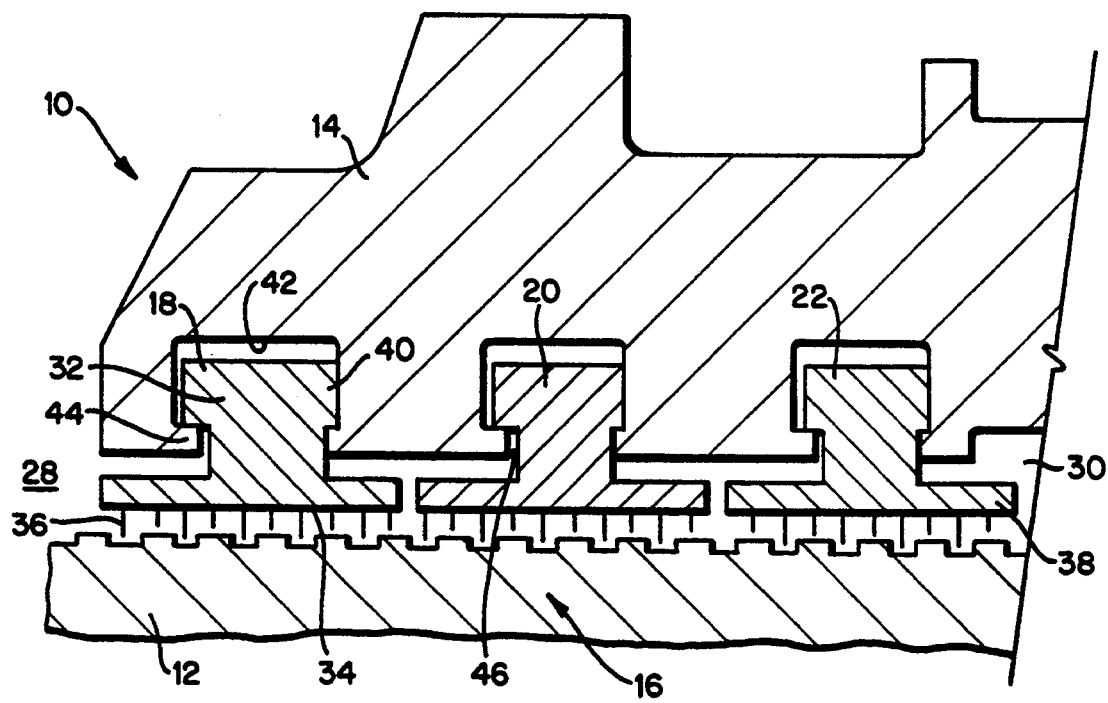
FIG. 1 is a fragmentary cross-sectional view of a portion of a steam turbine looking transversely of the axis thereof and illustrating a labyrinth seal.

Referring now to FIG. 1, there is illustrated a portion of a steam turbine, generally designated 10, having a turbine shaft 12, disposed in a turbine housing 14, and which shaft is supported for rotation by conventional means, not shown, within turbine housing 14. A multiple-stage labyrinth seal 16 includes a plurality of seal rings 18, 20 and 22 disposed about turbine shaft 12 separating high and low pressure regions 28 and 30 respectively. Each seal ring is formed of an annular array of a plurality of arcuate seal segments 32. In general, labyrinth seal 16 functions by placing a relatively large number of partial barriers to the flow of steam from the high pressure region 28 to the low pressure region 30. Each barrier forces steam, attempting to flow parallel to the axis of turbine shaft 12, to follow a tortuous path whereby a pressure drop is created. The sum of all the pressure drops in the labyrinth seal 16 is, by definition, the pressure difference between the high and low pressure regions 28 and 30.

As explained previously, one of the major problems associated with the initial placement of the annular sealing rings and their maintenance, including refurbishing and replacement, is the necessity to maintain the seal ring segments 32 concentric about and with seal faces at a uniform radial clearance with the sealing surface of the rotor, notwithstanding any distortion, eccentricity or non-standard size of the locating or fit flanges of the groove which form part of the housing for the seal rings. That is, the locating flanges of the seal ring support structure, oftentimes with use and wear, obtain an ellipticity or an eccentricity with respect to the rotor axis whereby fitting the seal ring segments to the locating flanges results in a lack of and non-uniform radial clearance between concentricity of the seal faces and the sealing surface of the rotor. Also, even if the locating flanges are round and coaxial with the rotor shaft, the desired uniform radial clearance, for example during replacement of the segments, may not be obtained due to the non-standard size of the locating fit. The present, invention therefore affords and maintains a uniform radial clearance between the seal faces of the segments and the sealing face of the rotor, notwithstanding any out-of-roundness or eccentricity of the locating flanges of the turbine housing due to use and wear or a non-standard size of the locating flanges and affords such uniform radial clearance and concentricity in both conventional and positive pressure variable clearance type labyrinth seal rings.

Figure 2A:
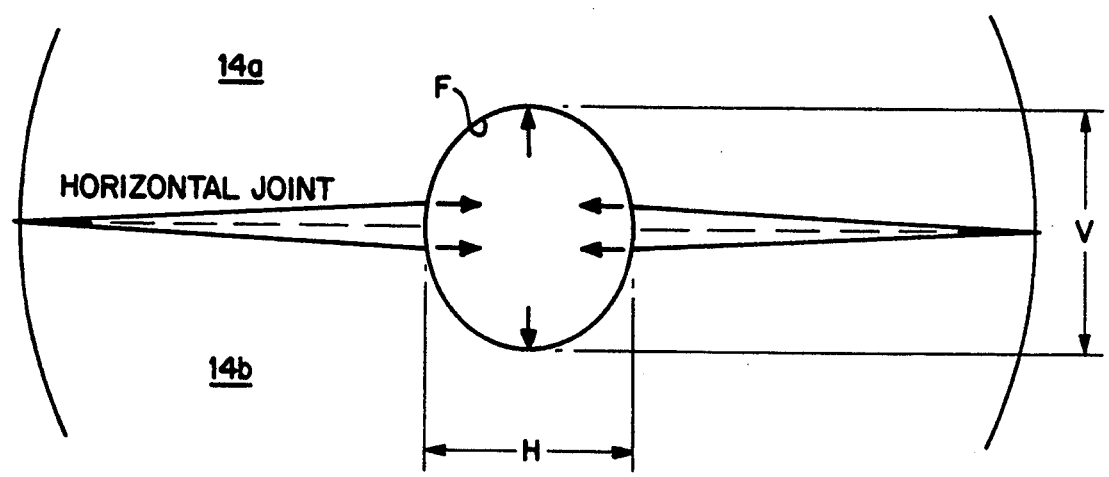
FIGS. 2A and 2B are schematic representations of upper and lower portions of a turbine casing having out-of-round or elliptical fits for the turbine seal.
Figure 2B:
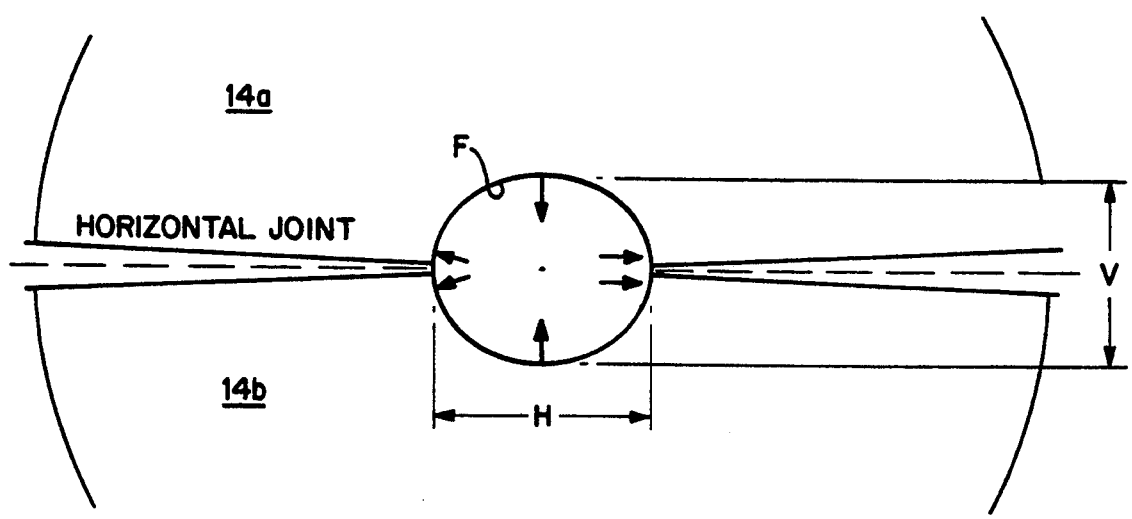
Figure 3:
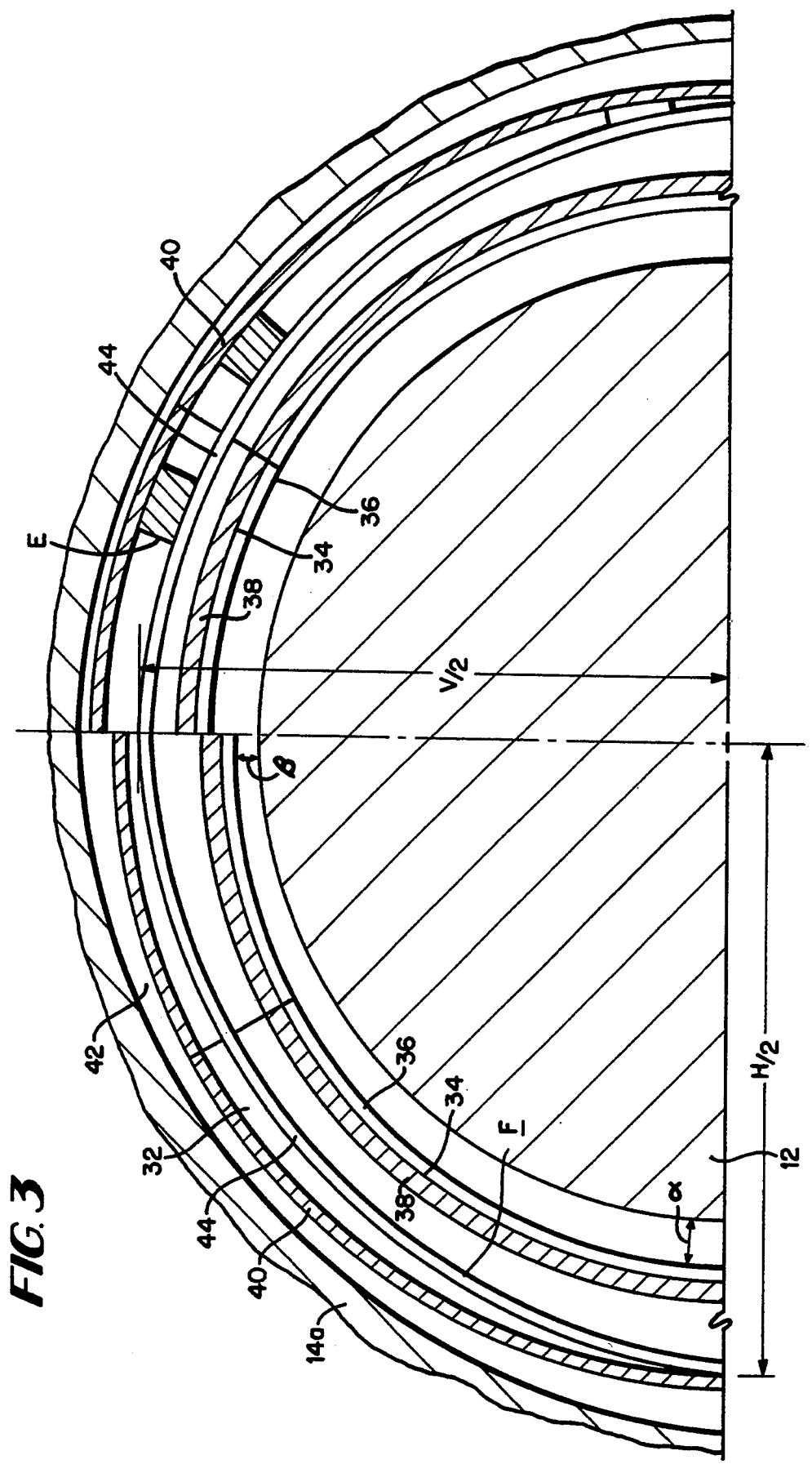
FIG. 3 is a split cross-sectional view of portions of a fit for the seal of a rotor with the left quadrant illustrating an aspect of the problem solved by this invention and the right quadrant illustrating a solution to that problem according to the present invention.

To illustrate the problem solved by the present invention, and specifically with respect to an out-of-roundness condition in the stationary support structure, reference is made to FIGS. 2A and 2B and to the left side of FIG. 3. In FIG. 2A, there is schematically illustrated upper and lower portions 14A and 14B, respectively, of a turbine housing. The locating fit for the arcuate ring segments is illustrated at F and, of course, the rotor shaft lies within fit F. Over time, e.g., with variations in temperature and pressure and other factors, the rotating fit F may come out-of-round and typically obtains an elliptical configuration, for example, the configuration of FIG. 2A with major and minor axes V and H, respectively, where V is greater than H. As illustrated in FIG. 2A, this sometimes occurs along the horizontal joint between turbine housing portions 14a and 14b with the joint tending to open along the radial interior of the casing 14 forming the elliptical fit F. In FIG. 2B, the distortion of the locating fit F is similarly elliptical but with the major axis H lying horizontal, H being greater than the minor axis V. In this situation, the horizontal joint opens radially outwardly of the casing 14. In either case, the fit F for receiving the arcuate seal ring segments 32 is distorted and out-of-round. Of course, variations in the fit F may occur which are of different configurations than elliptical and these likewise are accommodated by the present invention.

The elliptical configuration of the upper quadrants illustrated in FIG. 2B is illustrated in more detail in FIG. 3. It will be appreciated that the FIG. 3 illustration is exaggerated and certain elements are out of proportion relative to other elements to illustrate the nature of the problem and its solution according to the present invention.

With respect to FIGS. 1 and 3, the arcuate seal ring segments 32 have sealing faces 34 and radial projecting teeth 36, each sealing face 34 being formed by a pair of flanges 38 extending axially away from one another. The outer portions of the seal ring segments 32 include locating flanges or hooks 40 which similarly extend from segment 32 in axially opposite directions away from one another. As illustrated in FIG. 1, the turbine housing 14A has a generally dove-tail shaped annular groove 42 defined along its radially innermost portions by a pair of locating flanges 44 which extend axially toward one another defining a slot 46 therebetween.

Referring now to the left side of FIG. 3, it will be seen that, with the ellipticity illustrated in FIG. 2B, the locating flange 44 of the fit F is distorted, i.e., out-of-round. That is, the distance V/2 in the vertical direction from the rotor axis to flange 44 is less than the distance H/2 in the horizontal direction from the axis of rotor 12 to flange 44. With segments 32 lying along arcs of circles, it will be seen that the locating fits of segment flanges 40 and groove flanges 44 do not match and that, as a consequence, seal faces 34 have different radial clearances $\alpha$ and $\beta$ at different circumferential locations with respect to the sealing face of rotor 12. Seal faces 34 do not therefore have uniform radial clearances with respect to the shaft.

To provide a uniform radial clearance between the seal faces of the segments and the sealing surface of shaft 12 in accordance with the present invention, reference is made to the right-hand side of FIG. 3. In this illustration, locating flange 44 of the groove fit F has the same ellipticity as illustrated in FIG. 2B and is the mirror image of the left side of FIG. 3. However, means are provided in accordance with the present invention for enabling adjustment of the radial spacing between the locating flange 44 and the locating flange 40 of the segments 32 to establish a substantially uniform radial clearance about and between the rotating component 12 and the segmented seal faces 34 notwithstanding distortion, eccentricity or non-standard size of locating flanges 44. Generally, the adjusting means includes locating elements E have locating surfaces in the grooves between the segment flanges and the locating flanges which can be adjusted in radial extent, e.g., by the addition or removal of material from the elements or by displacement of the elements of their locating surfaces. Preferably, the locating elements E are carried by segments 32 at circumferentially spaced positions therealong with the locating surfaces lying in the groove between the segment flanges and the locating flanges of the groove, there being at least two elements per segment. The radial adjustment of the locating surfaces enables the locating flanges of the segment and the locating flanges of the groove to be variably spaced from one another about the the circumference to compensate for any distortion, eccentricity, or non-standard size of the locating flanges thereby to provide a uniform radial clearance between the segment seal faces 34 and the sealing face of the rotor 12.

Based on the foregoing general description of the present invention, various embodiments of the invention will be described with respect to the drawing Figures, wherein like reference numerals are applied to like parts in the drawing Figures followed by the suffix "a," "b," "c," etc., to distinguish among the various embodiments.

Figure 4:
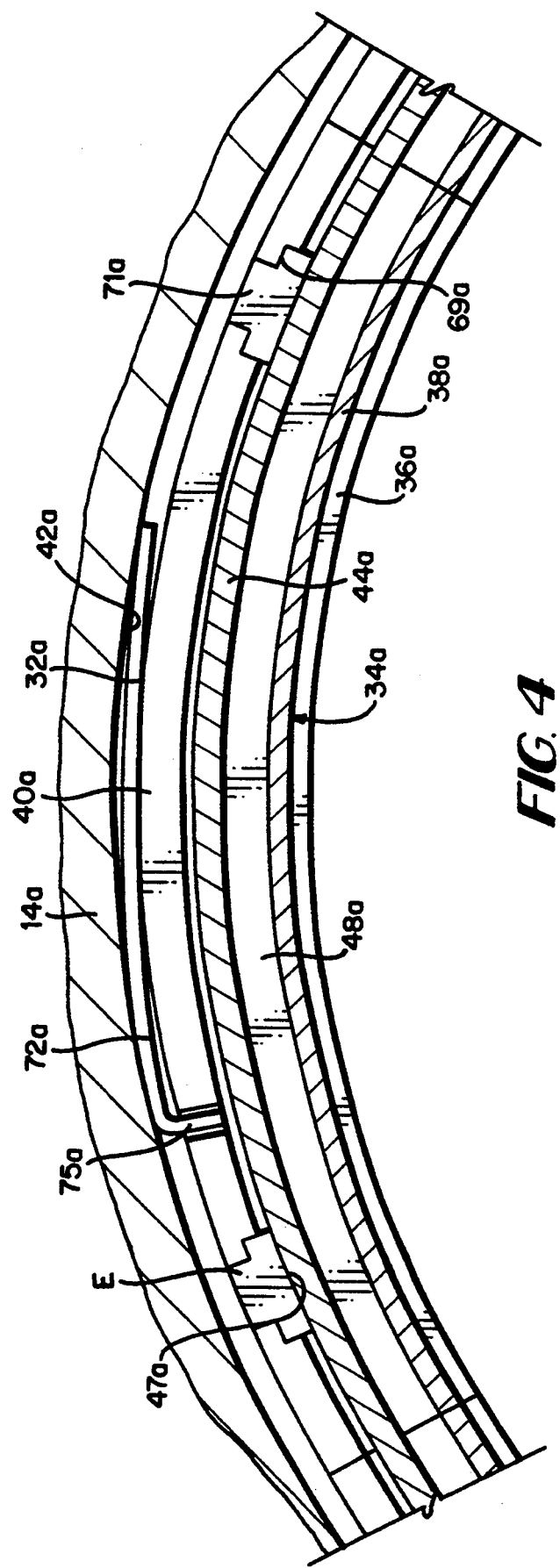
FIG. 4 is a fragmentary cross-sectional view of a portion of a fit of the stationary component illustrating a sealing segment and locating elements according to the present invention.
Figure 5:
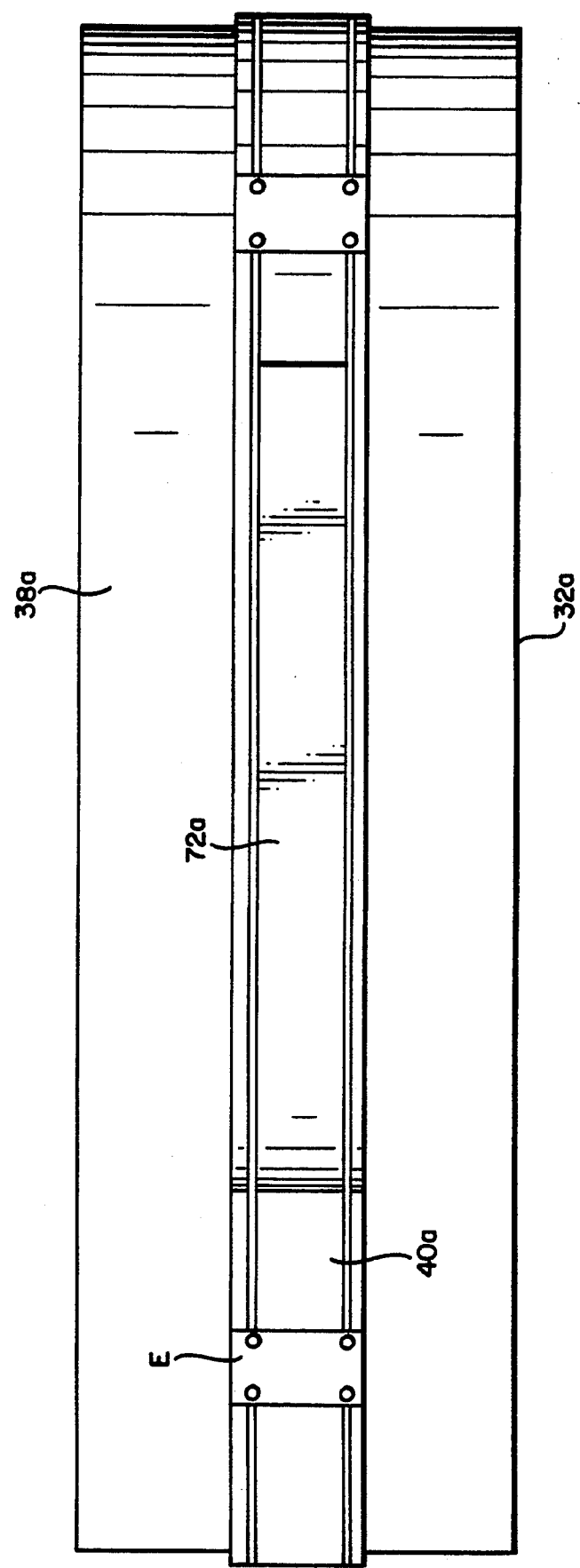
FIG. 5 is a top plan view of the seal segment illustrated in FIG. 4.
Figure 6:
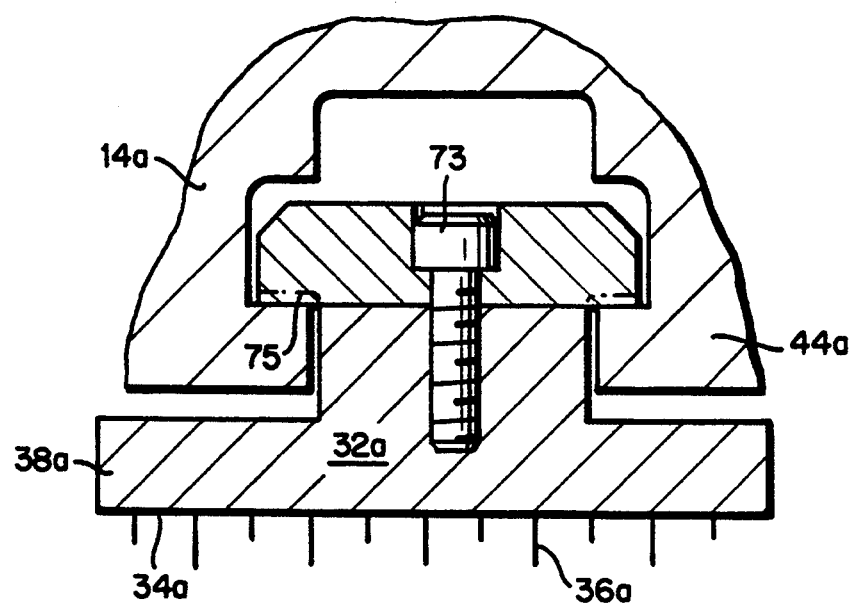
FIG. 6 is a cross-sectional view of the sealing ring segment of FIG. 4 and illustrating a locating element secured thereto.

Referring now to a first embodiment of the present invention, there is illustrated in FIGS. 4-6 a labyrinth seal of the same general configuration illustrated in FIG. 1 and incorporating the adjusting feature of the present invention. The seal includes a plurality of arcuate packing ring segments 32a arrayed about the machine axis, there being typically six segments. As previously described, each segment comprises an arcuate sealing face 34a, having a plurality of axially spaced teeth 36a extending radially inwardly therefrom, sealing face 34a being formed by the inner circumferentially extending surface of seal ring segment 32a defined by the pair of axially projecting flanges 38a. A pair of locating flanges or hooks 40a are provided along outermost portions of seal ring segments 32a and similarly extend from segments 32a in axially opposite directions away from one another. Turbine housing 14a, of course, has a generally dovetail shaped annular groove 42a, defined along its radially innermost portions by a pair of flanges 44a which extend axially toward one another defining a slot 46a therebetween. Seal ring segment 32a also includes a neck 48a which interconnects seal face 34a including flanges 38a with the radially outermost flanges 40a and, when segment 32a is installed in the groove 42a of housing 14, extends in slot 46a between flanges 44a. Segment 32a also includes a leaf spring 72a having a radially inwardly turned end 75a engaging in a slot along the outer surface of segment 32a. When the segment is installed, the spring engages the roof of the groove 42a and biases the segment for radial inward movement. The shaft 12, not shown in FIGS. 4-6, lies in radial opposition to the sealing ring faces 34a of segments 32a and has a plurality of grooves which are axially spaced one from the other and extend circumferentially about the shaft. The grooves along the shaft cooperate with teeth 36a to form the turbulent flow path for the steam.

With reference to FIGS. 3-6 and in accordance with the present invention, there is provided for each segment, as illustrated, at least a pair of locating elements E having locating surfaces 47a which cooperate between the locating flanges 40a and 44a of the segment and groove, respectively, to provide uniform radial clearance between the segment seal faces 34a and the sealing surface of rotor 12. In the illustrated form, each locating element E comprises a generally T-shaped pad 71a which is received in a complementary formed slot 69a by sliding in the axial direction. The T-shaped slot 69a is formed axially through the locating flanges 40a and portions of the segment neck 48a. T-shaped pad 71a may have a counterbored opening for receiving a bolt 73 for securing pad 71a to the segment 32. Other methods of securing the pad 71a to the segment may be provided. For example, as illustrated in FIG. 5, material of the pad or segment may be peened into a corresponding opening in the respective segment or pad. Importantly, by extending slot 69a into the neck portion 48a of segment 32a and securing pad 71a in slot 69a, it will be appreciated that the marginal faces 47a of pad 71a may bear on the locating flanges 44a below flanges 40a of segment 32a. Consequently, segment flanges 40a are spaced from the locating flanges 44a of the groove by the T-shaped pads 71a. By selectively adjusting the extent to which the locating surfaces 47a of locating element E are spaced below the undersurfaces of flanges 40a, the distortion, eccentricity or non-standard size of the locating flanges of 44a may be accommodated in a manner whereby segments 32a form a substantially perfectly annular array about the rotor axis with the seal surfaces 34a having uniform radial clearance about the sealing surface of rotor 12. By selectively grinding or adding material to the surfaces 47a to a greater or lesser extent or otherwise radially displacing surfaces 47a in accordance with the extent to which the groove is distorted, eccentric or of non-standard size at that circumferential location, the seal faces 34a of the segments are adjusted to provide a uniform radial clearance with the sealing surface of the rotor, notwithstanding any such distortion, eccentricity or off size of the locating flanges 44 of the annular groove fit.

Figure 7:
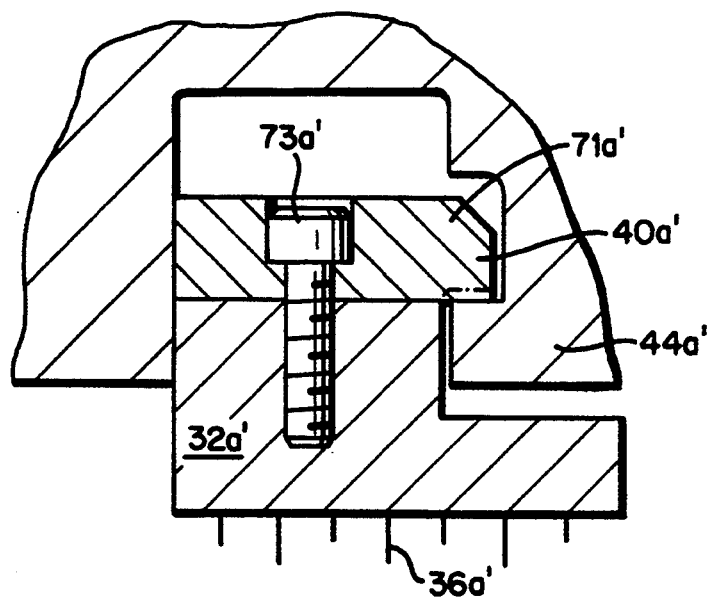
FIG. 7 is a view similar to FIG. 6 but illustrating a seal segment having a single hook fit.

Referring to FIG. 7, there is illustrated single hook seal ring segments 32a' and a single hook groove fit wherein each has only one axially extending locating flange 40a' and 44a' respectively. As in the case of the previously described double hook segments and grooves, these single book segments and grooves encounter the same problems as previously discussed and the same solution is applicable. For example, T-shaped pads 71a' are secured in complementary shaped slots 69a' in the single hook segment 32a' and may be adjusted as previously described to afford a uniform radial clearance between the seal faces of the single hook segments and the sealing surface of the rotor shaft.

Figure 8:
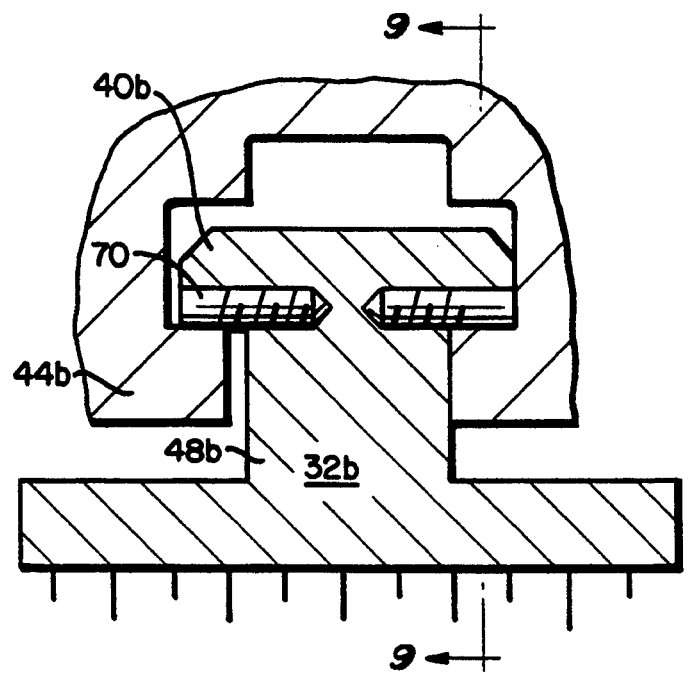
FIGS. 8 and 9 are respective transverse and axial fragmentary cross-sectional views illustrating a further embodiment hereof, with FIG. 9 being taken generally about on line 9—9 in FIG. 8.
Figure 9:
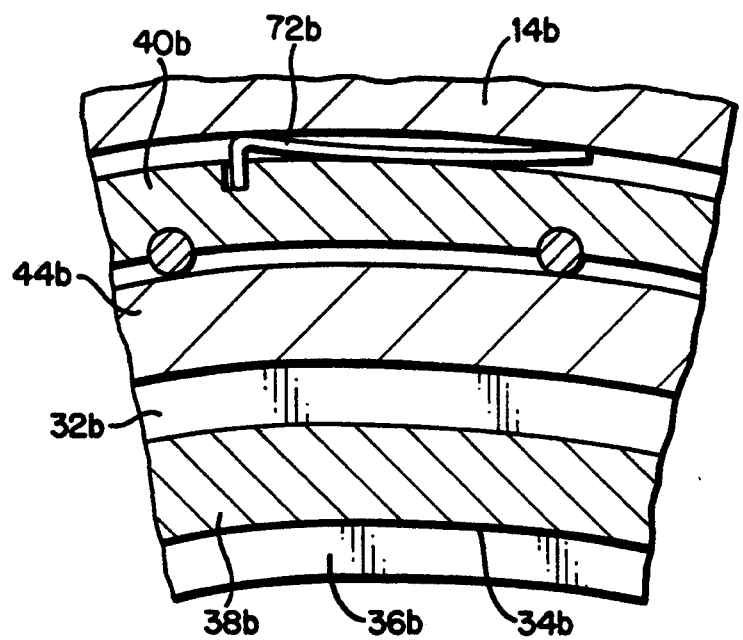

Referring now to FIGS. 8 and 9, there is illustrated a seal segment 32b, which typically is maintained engaged against locating flanges 44b. To compensate for any out-of-roundness, eccentricity or non-standard size of locating flanges 44b about the rotor axis, a plurality of dowels 70 may be disposed axially into each seal segment 32b at circumferentially spaced positions therealong and along opposite sides thereof. Dowels 70 are disposed in preformed openings adjacent the juncture of the undersides of flanges 40b and the neck 48b of the seal segments. The undersurfaces, i.e., the locating surfaces, of the dowels can be adjusted by reducing the material of or adding material to the dowels, or both, depending upon the adjustments necessary to compensate for the out-of-roundness, eccentricity or non-standard size of the flanges 44b at the various circumferential locations about turbine housing 14b. As illustrated in FIG. 9, segments 32b are biased in a radial inward direction by a leaf spring 72b.

Figure 10:
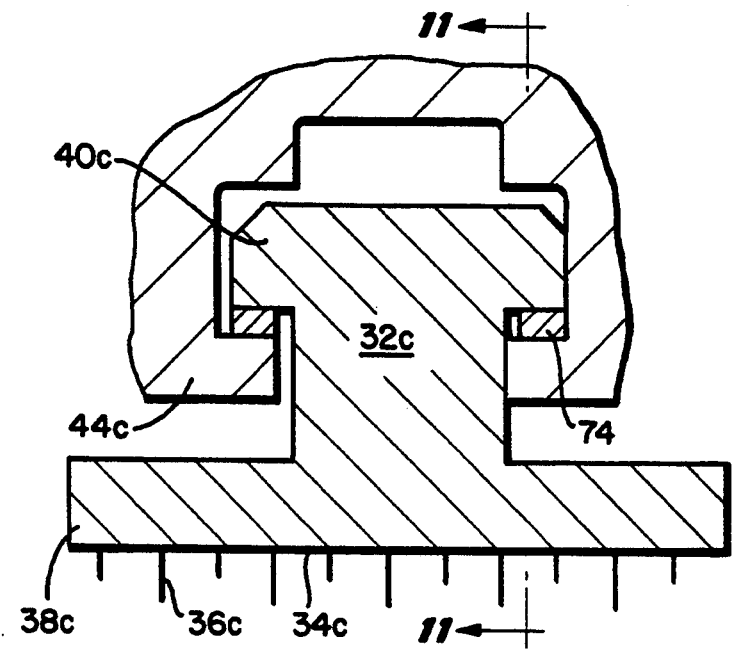
FIGS. 10 and 11 are similar views as FIGS. 8 and 9 showing a further embodiment of the locating elements of the present invention.
Figure 11:
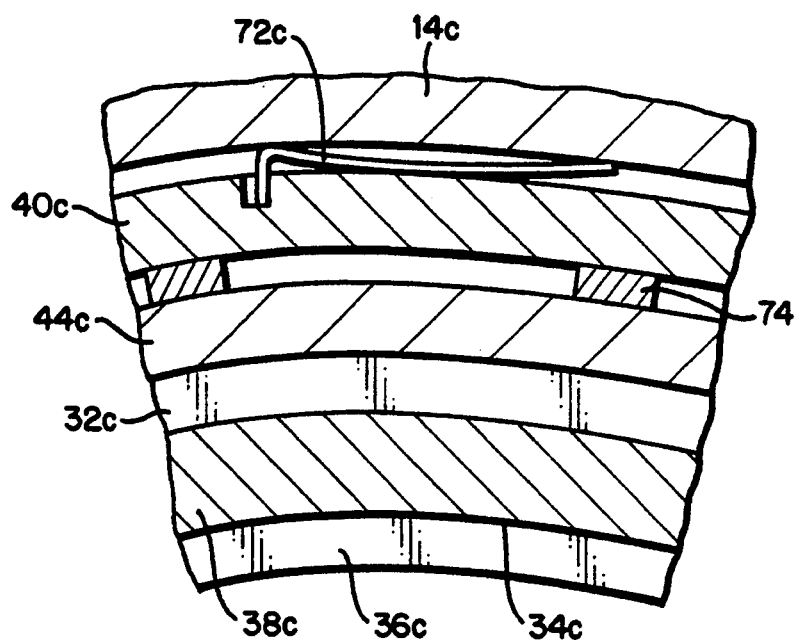

Referring now to FIGS. 10 and 11, a plurality of pads 74, for example, formed of a metal material, may be disposed along the undersides of flanges 40c of veal segments 32c. Pads 74 are disposed at circumferentially spaced positions about each segment and a spring 72c (FIG. 11) biases the seal segment 32c into engagement with locating flanges 44c. By appropriately adjusting the radial extent, i.e., the thickness, of pads 74, for example, by grinding or adding material, or both, at circumferentially spaced positions about the segments, the clearance between the undersides of flanges 40c and the locating flanges 44c, can be adjusted such that seal segments 32c combine to form an annular seal ring in substantially perfect concentricity about and having uniform radial clearance with the sealing surface of the rotor.

Figure 12:
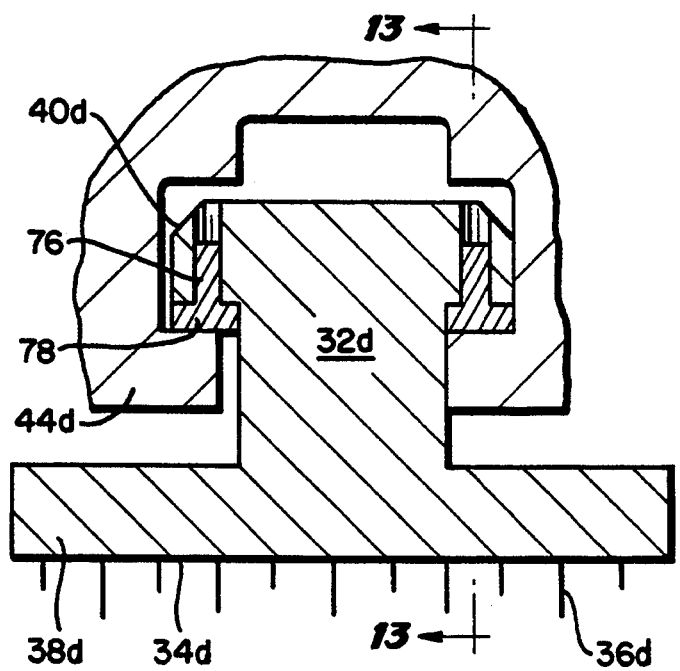
FIGS. 12 and 13 are views similar to FIGS. 8 and 9 illustrating a still further embodiment of the present invention.
Figure 13:
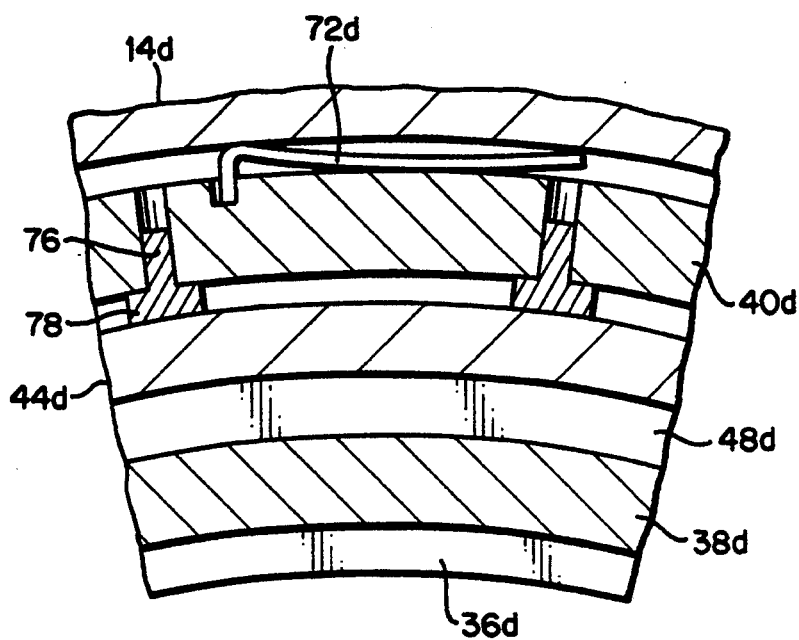

Referring now to FIGS. 12 and 13, a plurality of pins 76, each having an enlarged head 78, may be disposed in pre-drilled holes at circumferentially spaced positions about seal segment 32d. The heads 78 of pins 76 thus space the flanges 40d of the segments 32d from the locating flanges 44d of the turbine housing 14. By adjusting the thickness of the heads 78, for example, by grinding or adding material, or otherwise displacing the heads, seal segments 32d may be formed to comprise an annular seal ring substantially perfectly concentric about the sealing surface of rotor 12, notwithstanding the out-of-roundness, eccentricity or non-standard size of the locating flanges 44d about the rotor axis.

Figure 14:
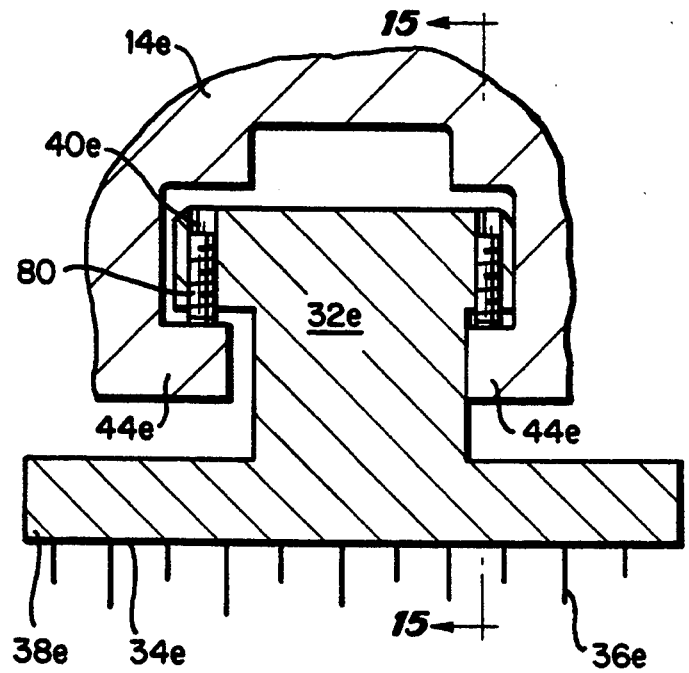
FIGS. 14 and 15 are views similar to FIGS. 8 and 9 illustrating a still further embodiment of the present invention.
Figure 15:
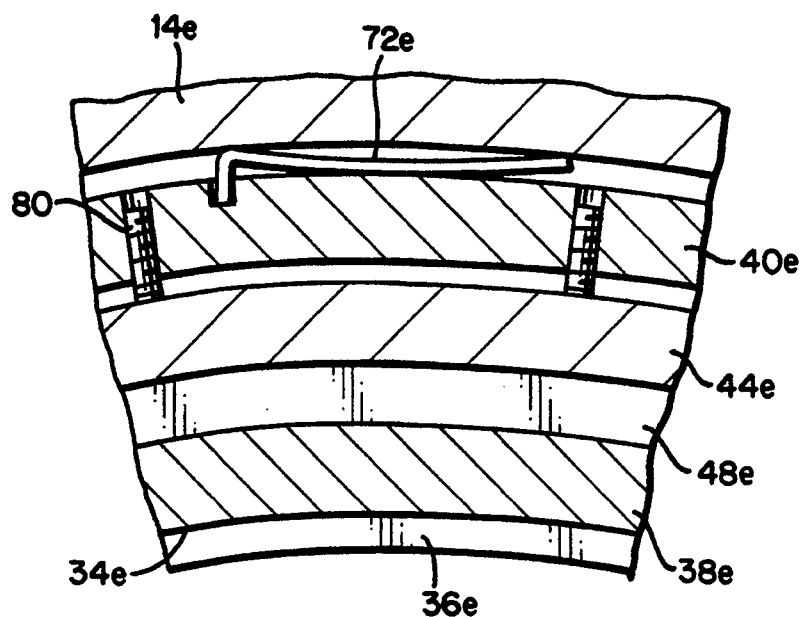

In FIGS. 14 and 15, seal segments 32e are provided with pins 80 formed in pre-drilled and tapped openings in flanges 40e of seal segments 32e. By varying the extent to which pins 80 extend radially from the pre-drilled holes into engagement with the outer surface of the locating flanges 44e, the clearance between the flanges 40e and locating flanges 44e may be adjusted at circumferentially spaced locations to ensure uniform radial clearance of the seal faces 34e about the sealing surface of the rotor, notwithstanding the out-of-roundness, eccentricity or non-standard size of the flanges 44e.

The foregoing description with respect to FIGS. 4–15 disclose the present invention in the context of its application to conventional packing rings where springs bias the packing ring segments radially inwardly against the groove fit and, with the aid of the locating elements in one or more of the various illustrated embodiments enables the seal faces of the segments to be maintained at a uniform radial clearance relative to the sealing surface of the rotor. In the ensuing description with respect to FIGS. 16–24, the present invention will be described with respect to its application in positive pressure packing rings where one or more springs bias the packing ring segments for radial outward movement and fluid pressure, i.e., steam, is supplied to displace the packing ring segments radially inwardly against the bias of the springs to form the seal face. FIGS. 16–20 disclose the application of the present invention to positive pressure packing ring segments having side seals and which are used where the grooves encounter high fluid pressures. FIGS. 21–24 disclose the application of the present invention to positive pressure packing ring segments without side seals where the diaphragm sees a lower pressure.

Turning now to FIGS. 16–20, the present invention is illustrated in the context of a positive pressure variable clearance packing ring segment with side seal. FIGS. 16 and 18 illustrate the seal ring segments in a radially outermost open position, while FIGS. 17 and 19 illustrate the seal ring segments in a radially innermost closed position as a result of positive displacement due to the fluid, e.g., steam, pressure as is clear from the above-mentioned U.S. Pat. No. 5,002,288. As in the prior embodiments, like parts are identified with the reference numerals followed by letter suffixes.

As in the prior embodiments, each seal ring is comprised of a plurality of arcuate packing ring segments 32f. Each segment 32f comprises a seal face 34f having a plurality of axially spaced teeth 36 extending radially inwardly therefrom, a pair of flanges 38f extending axially away from one another and mounting teeth 36f, a pair of locating flanges or hooks 40f which similarly extend from segment 32f in axially opposite directions, away from one another, and a neck 48f which interconnects seal face 34f, including flanges 38f, with the radially outermost flanges 40f. It will be appreciated that the turbine housing 14f has a generally dovetail-shaped annular groove 42f defined along its radially innermost portions by a pair of locating flanges 44f which extend axially toward one another defining a slot 46f therebetween. Shaft 12f has grooves 50f which are cooperate with teeth 36f to form the turbulent flow path for the steam in this positive pressure variable clearance packing ring seal. For a detailed discussion of the fluid pressures acting on seal ring segments 32f whereby the seal ring is moved between open and closed positions, reference is made to the above-identified U.S. patent.

In this packing ring, a pair of side seals 52f are provided for each seal ring segment and which side seals 52f are located between flanges 40f and 44f. Each side seal 52f is substantially coextensive in length with its corresponding seal segment 32f and includes a radially extending locating rib 54f. Each rib 54f extends within a slot 56f formed through flange 40f of segment 32f. Crush ribs 58f are provided at circumferentially spaced positions along each side seal 52f. Each side seal 52f also includes an elongated recess 60f for seating a spring 62f. The opposite ends of spring 62f bear against the underside of flange 40f, and its midsection bears against a central portion of recess 60f whereby the side seal 52f is biased for radial inward movement.

In accordance with the present invention, each side seal 52f has a plurality of circumferentially spaced surfaces 64f for engaging the underside of flanges 40f in a manner enabling adjustment of the radial clearance between the seal faces 34f to the sealing surface of rotor 12. With specific reference to FIGS. 16 and 18, it will be seen that, when the turbine is idle, springs 62f bias side seals 52f against the axially inwardly directed flanges 44f with the reaction force being provided by the abutment of flanges 40f against turbine housing 14. Consequently, in the position illustrated in FIG. 18, seal segments 32f lie in their radially outermost positions.

When the steam pressure acts on the seal segments to displace the segments radially inwardly as illustrated in FIGS. 17 and 19, flanges 40f bear against the circumferentially spaced surfaces 64f of side seals 52f. It will be appreciated from a review of both FIGS. 18 and 19 that the radially innermost surface of side seals 52f lies in continuous engagement along the outermost surface of locating flanges 44f.

In the event the locating flanges 44f are out-of-round, eccentric or of non-standard size, it will be appreciated that the various circular seal segments 32f, because of their indirect engagement with the locating flanges 44f through side seals 52f, would locate their seal faces 34f at different radial clearances vis-a-vis the sealing surface of rotor 12. To prevent this, and in accordance with the present invention, the out-of-roundness, eccentricity or non-standard size of the locating flanges 44f is initially determined. For example, if the locating flanges 44f have assumed an elliptical shape, with the minor axis passing through rib 54f, it will be appreciated that flange 44f will assume a more flattened configuration than if it was round. This flattened configuration is illustrated in FIG. 19a in an exaggerated view. FIG. 19a shows the adjustment of the segment according to the present invention with the segment in its closed condition. Thus, under positive fluid pressure, and with locating flanges 44f having the aforedescribed ellipticity, the clearances between the segment flanges 40f and the locating flanges 44f are different at circumferentially spaced positions thereabout as indicated at $\alpha$ and $\beta$ where $\alpha$ is less than $\beta$. The side seals 52f are formed sufficiently flexible such that, under the bias of springs 62f, their inner surfaces continuously engage the outer surfaces of the locating flanges 44f, notwithstanding any distortion, e.g., flattening-out, of such surfaces. After the variations in the clearances are determined, and to provide a designed uniform radial clearance between the seal surfaces 34f and the sealing surface of rotor shaft 12f, the surfaces 64f are adjusted in accordance with the present invention prior to installation of the segments, for example, by grinding or adding material, such that surfaces 64f are concentric with flanges 40f thereby accommodating for the out-of-roundness and enabling the sealing faces to have uniform radial clearance around the rotor shaft. As noted previously, material can be added and material subtracted from the various locating surfaces, or those surfaces may be displaced, depending upon the adjustment required to achieve the designed uniform seal clearance. In this manner, when seal segments 32f are displaced radially inwardly, e.g., by steam pressure, the circular undersurfaces of flanges 40f will engage the adjusted surfaces 64f of side seals 52f whereby the sealing faces 34f of the seal rings will have uniform radial clearance about the sealing surface of the rotor, notwithstanding the out-of-roundness, eccentricity or non-standard size of the locating flanges 44f of the stationary component. The seal surfaces 34f will lie concentric about the sealing surface of the rotor 12f because any out-of-roundness, eccentricities, or non-standard sizes of the locating flanges 44f has been compensated for by radial adjustment of surfaces 64f whereby seal segments 32f form a complete, substantially perfect annular seal about rotor 12f.

FIG. 20 illustrates a further form of a positive pressure packing ring segment 32g with a side seal 52g. Except as otherwise noted, the general configuration of this form of seal segment is similar to that of the segment illustrated in FIGS. 16-19. In this form, however, there is provided only one pair of leaf springs 62g for each segment with each spring 62g lying on the opposite side of the neck 48g of the segment. Instead of residing in slots formed along the outer surface of the side seals, as illustrated in the prior embodiment, springs 62g engage along the radially outermost surface of side seal 52g with their opposite ends engaging the underside of flanges 40g. Also, guide rib 54g extends in a slot 56g adjacent an end of the segment 32g. In this form and instead of providing locating surfaces formed on the side seals as in the previous embodiment, the adjustment is provided by locating elements E, in this preferred form, comprising T-pads 71g carried by segments 32g. Thus, a pair of T-pads 71g are slidable axially into corresponding slots 69g through the segment, particularly through the segment flanges 40g and a portion of neck 48g. Locating surfaces 47g of elements E are spaced radially inwardly of the underside of flanges 40g for engagement with the radially outermost surfaces of side seals 52g. By adjusting the radial extent of these locating surfaces on elements E, for example by adding or removing material from those surfaces at different circumferential locations about the segment to compensate for out-of-roundness, eccentricity or non-standard size of the locating flanges 44G, a uniform radial clearance between the seal faces 38g and the sealing surface of rotor shaft 12g may be obtained. Note that, in this form of the invention, the springs 62g are captured between the side seals 52G and segment flanges 40g between one locating element E and the guide rib 54g. The ends of the springs 62G may engage element E and guide 54g or may be spaced from them.

Also illustrated in FIG. 20 is an end butt seal generally indicated 80, for substantially sealing the end joints between adjacent seal segments 32. In this form, the butt seal may comprise a tongue 82 formed integrally with segment 32g and projecting tangentially therefrom. The adjoining segment 32g is provided with a recess 84 for receiving tongue 82 thereby affording a seal between adjoining segments to prevent escape of fluid, e.g., steam through the butt joints of the segments. The projections may extend from corresponding ends of the segments with the recesses formed in the opposite ends. Alternatively, alternate segments may be provided with the tongues and recesses, respectively.

Also illustrated in FIG. 20 is one of a pair of retaining keys 86 carried by the stationary component radially outwardly of the groove for limiting the extent of circumferential opening of the butt joints of the segments. Each key 86 is secured to the housing 14G by a bolt 88 and projects radially inwardly into a slot 90 formed in the end of a segment adjacent the horizontal joint between the upper and lower turbine housings. The retainer keys 86 preclude the segments in the upper turbine housing from falling from the groove fit thereof when the upper housing is removed from the lower housing. The retainer keys also minimize the amount of opening between the segments in the upper housing. Thus, with three segments in the upper housing, the retaining keys limit the opening between a pair of adjoining segments in the upper housing to a maximum equal to the combined clearance necessary for the two butt joints of the three segments to move radially inwardly and outwardly.

Referring now to the embodiment of FIGS. 21 and 22, there is illustrated another form of a positive pressure packing ring for a machine diaphragm which similarly includes a plurality of segments 32h. As in prior embodiments, each segment includes axially oppositely directed locating or hook flanges 48h and seal face flanges 38h connected by an axially reduced neck 48h extending between those flanges. The compensation or adjustment feature of the present invention is afforded by the provision of three circumferentially spaced locating elements E having radially inwardly directed locating surfaces 47h which are adjustable as previously described. Thus, to permit the segment to move radially inwardly at a desired circumferential position to provide uniform radial seal clearance about the rotor, the locating surfaces 47h of elements E may be ground or reduced or conversely to displace the segment radially outwardly for the same purpose the locating surfaces 47h of elements E can be increased by adding material. Alternatively, radially smaller or larger elements E may be provided with different radial locations of locating surfaces 47h.

It is a feature of this embodiment of the present invention that the springs 62h are located or constrained between the portions of locating elements E projecting radially inwardly. Thus, opposite ends of each spring 62h bear against the sides of circumferentially spaced locating elements E. It will also be appreciated that, when the adjustments are made to the locating surfaces of locating elements E, the spring deflection forces change. To restore the spring deflection to the designed force level, and where an adjustment to locating elements E has been made, for example, by reducing or grinding the locating surfaces 47h, small pockets can be ground in the elements E to accommodate the spring ends. This is schematically illustrated in FIG. 22A where the opposite circumferential sides of the T-pad 71h have been reduced as illustrated by the dashed line 89 to accommodate the ends of springs 62h. In this manner, the deflection force of the springs is returned to its originally designed force level. Alternatively, where the locating surface of locating elements E has been built up by adding material or a radially larger element E is provided, material can be added to the sides of T-pads 71h as illustrated in FIG. 22B. In this manner, the spring deflection forces can be restored. As a further alternative, of course, the ends of the springs can be reduced or extended to restore the spring deflection force.

Referring now to, FIG. 22C, there is illustrated a further form of positive pressure packing ring seal similar to the seal illustrated in FIG. 20. In this form, as in FIG. 20, the butt joints 80i of the adjoining segments 32i include the integrally extending tongue 82i with receiving slot 84i in the end of the adjoining segment 32i. Additionally, the upper diaphragm housing carries a dowel pin 90 which is receivable in a slot formed in the flange 40i of segment 32i adjacent the horizontal joint between the upper and lower turbine casings. Dowel pin 90, similarly as the retaining key 86, limits the amount of circumferential movement of the butt opening as well as maintains the upper segments from falling out of the upper casing when the upper diaphragm casing is removed. Dowel pin 90 may also be used with the embodiment of the invention illustrated in FIG. 24 described as follows.

Referring now to FIG. 23, there is illustrated a further embodiment of a butt joint between adjacent segments of any of the types previously described. In this embodiment, there is provided a slot 81 formed in the neck portion of a ring segment at its end face. The slot receives a spring 83 which biases a tongue 85 outwardly in a tangential direction to project the tongue from of the end face of the segment. The end face of the adjoining segment forms a surface against which the end of the projecting tongue 85 abuts. When butt seals of this type are used, the projecting tongue will thus always project to a maximum extent given the necessity of the segments to move radially between seal open and seal closed positions and hence provides an effective seal.

In FIG. 24 there is illustrated a positive pressure packing seal ring including a plurality of segments 32j. Each segment 32j as in the prior embodiments, includes axially extending locating or hook flanges 40j, sealing face flanges 38j, and a neck 48j interconnecting the flanges. Also in this embodiment, two locating elements E, in the form of T-shaped pads 71j are disposed in complementary axially opening slots in segments 32j at adjacent opposite ends thereof, the slots receiving T-shaped pads 71j passing through flanges 40j and neck portion 48j. Springs 62j are located between elements E below flanges 40j and bias the segments for movement in a radially outward direction. Integral projecting tongues 82j for reception in corresponding slots 84j are also provided, forming butt seals between adjacent segments.

In this embodiment, as illustrated in FIG. 24a, a fluid, e.g., steam passage 92 opens on the high pressure side of segment 32j into the neck portion 48j. The steam passage 92 opens through the top of the segment into the groove cavity or annulus on top of the seal ring. This enables high pressure fluid to pass from the high pressure side into the groove annulus to close the ring segments, i.e., displaces them in the radially inward direction. This avoids the necessity of forming steam passages in the stationary casing for this purpose when field installing ring segments.

Referring now to FIGS. 25 and 26, there is illustrated a further application of the present invention to the seal between rotating and stationary components of a turbine wherein the rotating component comprises a turbine wheel. In FIG. 26, the buckets of a turbine wheel are illustrated at 100, the buckets 100 having a bucket cover 102. Typically, a tip spill strip segment 104 is secured to the stationary component of the turbine and has a radially inwardly projecting tip 106 for forming a seal with the rotary component, i.e., the turbine bucket cover 102. As with the packing ring segments previously described, the seal between the turbine wheel and the tip spill strip segment is subject to the same problems associated with a stationary part as previously described, i.e., out-of-round mounting grooves, eccentricity of the mounting grooves or non-standard sized grooves. It will be appreciated from a review of FIG. 25 that a standard tip spill strip segment 104 includes an axially extending flange 108 for mounting within a groove 110 in a stationary structure 112. In conventional practice, a spring 114 extends about the outer periphery of segments 104 to maintain the segment 104 in a radially innermost sealing position about the bucket cover.

To accommodate out-of-roundness, eccentricity or non-standard sizing of groove 110, in accordance with the present invention, the radial edges of the mounting flange 108 of the tip spill segments 104, are relieved for example by machining, as illustrated by the dashed lines 116 in FIG. 25. The flange surfaces are functionally replaced by adjusting dowels or keys 118 which extend axially through the segments 104 at circumferentially spaced positions. Thus, by adjusting the locating surfaces 103 of the dowels which project axially beyond the segment 104 to engage the groove fit 110, at circumferentially spaced positions about the stationary part, the radial clearance between the seal 106 and bucket cover 102 can be maintained substantially uniform. That is, by adding or subtracting material or providing different sized keys or dowels in the tip spill segment, the segments can be adjusted to accommodate the out-ofroundness, eccentricity or non-standard sizes of the locating fits 102.

The following is a description of the method of assembling the packing rings and installing the packing rings for both the positive pressure packing rings with side seals illustrated in FIG. 20 hereof and the positive pressure packing rings without side seals as illustrated in FIGS. 21–24. The packing ring segments with side seals, for example the segments illustrated in FIG. 20, may be shipped to the installation site fully assembled using compression tools. This tool is universal for all segments of this type and, with reference to FIGS. 27 and 28, comprises a pair of laterally spaced legs 100 having flanges 102 an opposition to one another and joined at their opposite ends by a dowel 104. A threaded screw 106 extends through a central portion of the dowel between the legs for engaging the outer surface of the flanges 40. Thus, the flanges 102 of the legs engage along the radially inner surface of the side seals 52 with the screw thread engaging along the outer surface of the segment. In this manner, the side seals are maintained assembled to the segments with the springs 62 located between the side seals and flanges 40.

When positive pressure packing rings of this type are installed, the stationary grooves often require enlargement. If field machining is required for this purpose, the locating flanges 44 may also be checked for eccentricity or out-of-roundness and machined to a perfectly round configuration to achieve the uniform radial clearance. In this latter case, the locating elements of the segments need not be adjusted and the installation can go forward without such adjustment. If the stationary groove does not require enlargement and the groove is eccentric, out-of-round or non-standard in size, the radial adjustment must be performed. The out-of-roundness, eccentricity or non-standard size of the grooves are first determined at each of the circumferential positions of the adjustments. Thus, for example with the embodiment illustrated in FIG. 20, oversized or undersized T-shaped pads 21 are provided and selected depending upon the amount of adjustment necessary at each circumferential location. The pads can be field ground or material can be added to obtain in-between sizes. Other adjustments may then be made for example changing the spring length to maintain the correct spring force or forming grooves or adding material at the T-pads against which the spring ends will abut (see FIGS. 22A and 22B).

Having established the appropriate size of the adjustment, and identified and/or adjusted the appropriate T-pads 71, T-pads 71 can the be disposed in the complementary slots at the correct circumferential locations and secured in place, for example, by peening or bolting. When peening, only one side of the key is peened although two grooves are provided as illustrated an FIG. 5, in order to permit reuse of the key. The groove fits of the stationary component are the cleaned.

If integral butt tongues are not provided, the springs 83 are located in slots 81. Butt tongues are then located in the butt tongue spring slots compressing the springs, the tongues projecting from the ends of the segments.

If the segments are not delivered at the field installation site in assembled condition, the ring segments may be assembled on site by locating each segment on a flat surface with its teeth facing upwardly. The wide seal ring may be placed against the ring's neck adjacent the wide shoulder, the crush pins facing outwardly. The wide spring is then placed between the side seal and flange 40. This procedure is then repeated for the narrow side of the segment. The compression tool is then placed over one end of the assembly until it is midpoint of the spring length. The tool is then tightened by rotating the thumb screw until full closure of the ring is achieved. Another compression tool is then placed on an end of the packing ring.

The packing segment is then inserted into the groove, free end first, until it hits a compression tool. The tool is then loosened and the packing ring springs are checked to ensure that they are retained in the segment cavity. The loose compression tool is then displaced toward the end compression tool as the ring is inserted further into the groove. The second compression tool is then loosened and the ring is completely inserted into the groove and located in its final, predetermined position. The procedures are repeated for each of the remaining segments for each of the housings.

Closed tooth-to-tooth diameter measurements are then taken to check for desired radial clearances before the rotor is placed back in the turbine. The ring segments are then displaced at the horizontal joint past the joint and further into the groove. Wedges may then be inserted between the packing ring and packing bore to close the rings and tooth-to-tooth diameters of the high teeth may be taken for comparison with the measured rotor diameter measurements. The compared clearances should be acceptable. The rings are then permitted to slide toward the joint and the retaining pins or keys are installed in the upper half packing rings to prevent the rings from falling during handling.

With respect to the diaphragm packing rings of the positive pressure type illustrated in FIGS. 21–24, the parts of these segments may be shipped to the installation site in disassembled form. The diaphragm packing rings are typically installed into existing diaphragm packing dove-tails without enlarging the packing grooves. If the grooves require machining for enlargement, then the hook or locating flanges 44 may be machined to accommodate any out-of-roundness, eccentricity, or non-standard size. However, if the packing groove enlargement is not required and the grooves are out-of-round, eccentric or non-standard, various sizes of elements E, for example the T-pads 71, are selected in accordance with the necessary adjustment for each of the circumferential positions about the turbine. After the appropriate T-pads are selected, and any adjustments to the selected T-pads as necessary have been made, the T-shaped pads may be staked in place as previously described. The dove-tails may then be cleaned of any foreign matter.

The middle ring segment is then placed on a horizontal surface with its teeth facing upwardly. The wide and narrow springs are then placed on opposite sides of the packing ring with appropriate adjustments as necessary as previously described. The packing ring is then inserted into the diaphragm groove until the springs are engaged in the dove-tail. If the segment has a second set of springs, those springs are then inserted between the other sets of locating elements E. The ring is then further inserted into the diaphragm into its final position. The remaining two-ring segments are then similarly inserted into the diaphragm groove for each housing and the tongue-and-groove fits between the segments should be checked. Similar measurements as previously described with the segments having side seals may be taken to ensure the concentricity of the seal faces to the sealing surface of the rotor. The rotor is then disposed in the turbine and the housing reassembled.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. In a machine having a component rotatable about an axis and a stationary component including an annular groove about said axis, said stationary component having at least one axially directed locating flange about said axis and in part defining a slot opening into said groove and a plurality of annular segments about said axis, each segment having an arcuate seal face, at least one axially directed flange for disposition in said groove, and a neck portion receivable in said slot and interconnecting the seal face and the flange of said segment, a method of compensating for deviation in radial clearance between said seal faces and the rotatable component from a predetermined substantially uniform radial clearance therebetween comprising the steps:

identifying the extent of the deviation of the locating flange of the groove from a predetermined radial location thereof about the axis; and adjusting the flanges of said segment relative to the locating flange of the groove in accordance with the extent of said deviation of the locating flange of the groove from said predetermined uniform radial location thereof about the axis to establish a substantially uniform radial clearance about and between the seal faces of the segments and the rotating component.

2. A method according to claim 1 including the step of inserting a tongue projecting from one end of a segment into a receiving slot at an adjoining end of an adjoining segment to form a seal between the adjoining segments.

3. A method according to claim 1 including the step of providing a stop cooperable between the stationary component and a segment, respectively, to limit movement of said segments in a circumferential direction.

4. In a machine having a component rotatable about an axis and a stationary component including an annular groove out-of-round or eccentric about said axis, said stationary component having a pair of axially inwardly directed locating flanges out-of-round or eccentric about said axis and defining the out-of-roundness or eccentricity of said groove about said axis, and a plurality of annular segments about said axis, each segment having an arcuate seal face, a pair of flanges directed axially away from one another and disposed in said groove, and a neck portion received in said slot and interconnecting the seal face and pair of flanges, a method of compensating for out-of-roundness or eccentricity of the locating flanges of said groove about said axis, comprising the steps of:

identifying the extent of out-of-roundness of eccentricity of the locating flanges of the groove; and adjustably spacing the flanges of said segments relative to the locating flanges of the groove in accordance with the extent of out-of-roundness or eccentricity of the flanges of the groove about the axis such that the seal face of the segments provide a substantially uniform radial clearance with the rotating component.

5. A method according to claim 4 including locating at least a pair of locating surfaces at circumferentially spaced positions about each said segment for spacing the flanges of said segments relative to the locating flanges of the groove and adjusting the radial location of the locating surfaces in accordance with the extent of the out-of-roundness or eccentricity of the locating flanges of the groove.

6. A method according to claim 5 including forming said segments and said groove such that said segments are movable in a radial direction between first and second positions, biasing said segments for movement into said first position, and adjusting said locating surfaces to locate said segment flanges relative to said locating flanges of the groove to establish a substantially uniform radial clearance about and between the rotating component and the segment seal faces.

7. In a machine having a component rotatable about an axis and a stationary component including an annular groove about said axis, said stationary component having at least one axially directed locating flange about said axis and in part defining a slot opening into said groove and a plurality of annular segments about said axis, each segment having an arcuate seal face, at least one axially directed flange for disposition in said groove, and a neck portion receivable in said slot and interconnecting the seal face and the flange of said segment, a method of compensating for deviation in radial clearance between said seal faces and the rotatable component from a predetermined substantially uniform radial clearance therebetween comprising the steps:

identifying the extent of the deviation of the locating flange of the groove from a predetermined radial location thereof about the axis;

adjusting the flanges of said segment relative to the locating flange of the groove in accordance with the extent of said deviation of the locating flange of the groove from said predetermined radial location thereof about the axis to establish a substantially uniform radial clearance about and between the seal faces of the segments and the rotating component; and locating at least a pair of locating surfaces at circumferentially spaced positions about each said segment for spacing the flanges of said segments relative to the locating flange of the groove and adjusting the locating surfaces in accordance with the extent of the deviation of the flange of the groove from a predetermined radial location thereof about the axis to adjustably space the flanges of said segments relative to the locating flange.

8. A method according to claim 7 including forming said segments and said groove such that said segments are movable in a radial direction between first and second positions, biasing said segments for movement into said first position and adjusting said locating surfaces to locate said segment flanges relative to said locating flange of the groove to establish a substantially uniform radial clearance about and between the rotating component of the segment seal faces.

9. In a machine having a component rotatable about an axis and a stationary component including an annular groove about said axis, said stationary component having at least one axially directed locating flange about said axis and in part defining a slot opening into said groove and a plurality of annular segments about said axis, each segment having an arcuate seal face, at least one axially directed flange for disposition in said groove, and a neck portion receivable in said slot and interconnecting the seal face and the flange of said segment, a method of compensating for deviation in radial clearance between said seal faces and the rotatable component from a predetermined substantially uniform radial clearance therebetween comprising the steps:

identifying the extent of the deviation of the locating flange of the groove from a predetermined radial location thereof about the axis;

adjusting the flanges of said segment relative to the locating flange of the groove in accordance with the extent of said deviation of the locating flange of the groove from said predetermined radial location thereof about the axis to establish a substantially uniform radial clearance about and between the seal faces of the segments and the rotating component; and wherein said deviation of the locating flange of the groove from the determined radial location thereof, without correction, constitutes an out-of-roundness of said locating groove about said axis, and including identifying the extent of out-of-roundness of the locating flange of the groove, and adjusting the spacing of the flanges of said segments relative to the locating flange of the groove in accordance with the extent the locating flange is out-of-round about the axis to provide said correction thereby to establish substantial concentricity of said seal faces relative to the rotating component.

10. In a machine having a component rotatable about an axis and a stationary component including an annular groove about said axis, said stationary component having at least one axially directed locating flange about said axis and in part defining a slot opening into said groove and a plurality of annular segments about said axis, each segment having an arcuate seal face, at least one axially directed flange for disposition in said groove, and a neck portion receivable in said slot and interconnecting the seal face and the flange of said segment, a method of compensating for deviation in radial clearance between said seal faces and the rotatable component from a predetermined substantially uniform radial clearance therebetween comprising the steps:

identifying the extent of the deviation of the locating flange of the groove from a predetermined radial location thereof about the axis;

adjusting the flanges of said segment relative to the locating flange of the groove in accordance with the extent of said deviation of the locating flange of the groove from said predetermined radial location thereof about the axis to establish a substantially uniform radial clearance about and between the seal faces of the segments and the rotating component; and wherein said deviation of the locating flange of the groove from the determined radial location thereof without correction, constitutes an eccentricity of said locating groove about said axis, and including identifying the extent of eccentricity of the locating flange of the groove and adjusting the spacing of the flanges of said segments relative to the locating flange of the groove in accordance with the extent the locating flange is eccentric about the axis to provide said correction thereby to establish substantial concentricity of said seal faces relative to the rotating component.

* * * * *